(12) United States Patent
Ouedraogo et al.

(10) Patent No.: US 12,192,484 B2
(45) Date of Patent: Jan. 7, 2025

(54) METHOD AND APPARATUS FOR ENCAPSULATING ENCODED MEDIA DATA IN A MEDIA FILE

(71) Applicant: CANON KABUSHIKI KAISHA, Tokyo (JP)

(72) Inventors: Naël Ouedraogo, Val d'Anast (FR); Franck Denoual, Saint Domineuc (FR); Frédéric Maze, Langan (FR); Hervé Ruellan, Rennes (FR); Lionel Tocze, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/718,072

(22) Filed: Apr. 11, 2022

(65) Prior Publication Data

US 2022/0337846 A1    Oct. 20, 2022

(30) Foreign Application Priority Data

Apr. 13, 2021   (GB) ..................... 2105279

(51) Int. Cl.
    *H04N 19/70*     (2014.01)
    *H04N 19/169*    (2014.01)
    *H04N 19/172*    (2014.01)
    *H04N 19/184*    (2014.01)
    *H04N 19/46*     (2014.01)

(52) U.S. Cl.
    CPC ......... *H04N 19/172* (2014.11); *H04N 19/184* (2014.11); *H04N 19/188* (2014.11)

(58) Field of Classification Search
    None
    See application file for complete search history.

(56) References Cited

U.S. PATENT DOCUMENTS

2022/0394301 A1\*  12/2022  Deshpande .......... H04N 19/172
2023/0027058 A1\*   1/2023  Hannuksela ..... H04N 21/85406

FOREIGN PATENT DOCUMENTS

GB    2581852 A  \*  9/2020  .......... H04N 19/117
GB    2590435 A      6/2021

\* cited by examiner

*Primary Examiner* — Samuel D Fereja
(74) *Attorney, Agent, or Firm* — Canon U.S.A., Inc. IP Division

(57) ABSTRACT

The present invention concerns a method of encapsulating subpicture bitstreams in at least one media file, the subpicture bitstreams corresponding to encoded media data of a subpicture corresponding to a rectangular region of video data, the method comprising: obtaining the plurality of subpicture bitstreams; encapsulating each subpicture bitstream in a subpicture track; generating at least one base track referencing at least two subpicture tracks and forming a spatial arrangement of the at least two subpicture tracks; generating information describing APS referenced by samples of the at least two subpicture tracks; encapsulating the subpicture tracks, the at least one base track and the information describing APS in the at least one media file.

9 Claims, 8 Drawing Sheets

METHOD AND APPARATUS FOR ENCAPSULATING ENCODED MEDIA DATA IN A MEDIA FILE

PRIORITY CLAIM/INCORPORATION BY REFERENCE

This application claims the benefit under 35 U.S.C. § 119(a)-(d) of United Kingdom Patent Application No. 2105279.0, filed on Apr. 13, 2021 and entitled "METHOD AND APPARATUS FOR ENCAPSULATING ENCODED MEDIA DATA IN A MEDIA FILE". The above cited patent application is incorporated herein by reference in its entirely.

FIELD OF THE DISCLOSURE

The present disclosure concerns a method and a device for encapsulation of a media file. It concerns more particularly the encapsulation of a video bitstream comprising subpictures aiming to allow dynamic merging of subpicture bitstreams.

BACKGROUND OF DISCLOSURE

The compression of video relies on block-based video coding in most coding systems like HEVC, standing for High Efficiency Video Coding, or the emerging VVC, standing for Versatile Video Coding, standard. In these encoding systems, a video is composed of a sequence of frames or pictures or images or samples which may be displayed at several different times. In the case of multi layered video (for example scalable, stereo, 3D videos), several frames may be decoded to compose the resulting image to display at one instant. A frame can be also composed of different image components. For instance, for encoding the luminance, the chrominances or depth information.

A frame may also be spatially divided into spatial areas, generally rectangular, called sub-pictures or tiles depending on the considered compression format. The corresponding subpictures in a sequence of frames can be encoded independently to form a subpicture bitstream. The encoded video bitstream is then composed of the different subpicture bitstreams.

The encoded media content is typically encapsulated into one or several media files comprising the encoded media data along with descriptive metadata for distribution. The distribution may take the form of streaming of the media data, downloading of the media data and the like. A popular standard defining a possible format for media files encapsulating encoded media data is called ISOBMFF. According to this standard the media file is composed of a hierarchy of embedded data-structures, called boxes, comprising the descriptive metadata and the encoded media data. At high level, an ISOBMFF file comprises two different boxes, a 'moov' box or alike, that comprises the descriptive metadata and a 'mdat' boxe that comprises the actual encoded media data.

An encoded media data bitstream is composed of Network Abstraction Layer Units, or NAL Units, comprising the encoded data. NAL Units may have different types according to their content. Two different kind of NAL Units may be distinguished, the VCL NAL Units containing the encoded media data, and the non-VCL NAL Units comprising different parameters required for the decoding of the VCL NAL Units.

Among the different non-VCL NAL Units, different parameter sets are defined. The SPS (Sequence Parameter Set) non-VCL NAL Unit defines some parameters that are valid for a whole stream. The PPS (Picture Parameter Set) non-VCL NAL Unit defines some parameters that are valid for a picture. The APS (Adaptation Parameter Set) may define some parameters used for the ALF (Adaptive Loop Filter), used to overcome the possible encoding artefact that may appear on coding blocks. APS may also defines parameters for LMCS or scaling list An APS with syntax elements used to construct the scaling lists.

It is reminded here that the encoding process comprises the division of the frame into Coding Tree Units (CTU), a CTU is the elementary block of pixel used at encoding. The NAL units comprise one or several slices of CTU. The fact that ALF is to be performed, and if it is performed the reference of an APS NAL Unit providing the parameters to be used to perform the ALF is signalled in a header of the slice. Accordingly, an APS is associated with a slice of encoded data.

Different types of APS may be defined. Accordingly, an APS NAL Unit comprises a type identifying the type of APS, an identifier identifying the APS within a type of APS and a content defining the ALF parameters. An APS NAL Unit is completely determined by its type and identifier. When an APS NAL Unit is introduced in a bitstream with a given type and identifier, its content overwrites the content of any previous APS with the same type and identifier in the bitstream. NAL Units may comprise, typically in a slice header, a reference to the APS providing the parameters to be used for applying the ALF to the data comprised in the NAL Unit. This reference takes the form of a syntax element value that corresponds to an identifier of the APS and the type of the APS being specified by the semantics of the syntax elements. At decoding, the parser obtains this reference and identifies the previously received APS with the same type and identifier to determine the parameters to be used for the decoding of the data in the NAL Unit. The same identifier may be reused in a same bitstream to identify a new APS, the content of the new APS then overwrites the content of the previous APS with the same identifier and same type. In practice, only a few different APS identifier values are required for a given bitstream (e.g. 8 for ALF APS as defined in VVC specification). Accordingly, only a few different identifiers values, coded on a few bits, are provided to be used as APS identifiers.

When encapsulating subpicture bitstreams in a media file, each subpicture is associated with a corresponding subpicture bitstream and is encapsulated in a subpicture track. It may be advantageous to encapsulate tracks corresponding to a plurality of subpictures and called merged subpicture track. Such track may be seen as a composition track from several subpictures tracks. The bitstream resulting from the parsing of a merged track is called a merged subpicture bitstream. It is composed of the subpicture bitstreams of the merged subpictures as indicated in the merged track. Due to the low number of available identifiers for the APS, the merged subpicture bitstream is likely to comprise APS NAL Units from the different subpicture bitstreams with the same type and identifier but with a different content. Accordingly, a risk of collision appears and needs to be taken into account at parsing to allow the identification of the right APS when decoding a VCL NAL Unit. A collision occurs in the merged bitstream when two different APS with same identifier and type but different content occur in the bitstream associated with two NAL Units providing data related to the same presentation time.

SUMMARY OF THE DISCLOSURE

The present disclosure has been devised to address one or more of the foregoing concerns.

According to a first aspect of the invention there is provided a method of encapsulating subpicture bitstreams in at least one media file, the subpicture bitstreams corresponding to encoded media data of a subpicture corresponding to a rectangular region of video data, the method comprising:
  obtaining the plurality of subpicture bitstreams;
  encapsulating each subpicture bitstream in a subpicture track;
  generating at least one base track referencing at least two subpicture tracks and forming a spatial arrangement of the at least two subpicture tracks;
  generating information describing APS referenced by samples of the at least two subpicture tracks;
  encapsulating the subpicture tracks, the at least one base track and the information describing APS in the at least one media file.

According to another aspect of the invention there is provided a method of reconstruction of an encoded media data bitstream from at least one media file, the at least one media file comprising subpicture bitstreams, a subpicture bitstream corresponding to encoded media data of a subpicture corresponding to a rectangular region of video data, the method comprising:
  obtaining from the at least one media file a base track referencing at least two subpicture tracks and forming a spatial arrangement of the at least two subpicture tracks;
  obtaining from the at least one media file information describing APS;
  generating the encoded media data bitstream corresponding to the base track from the corresponding subpicture bitstreams associated with the at least two subpicture tracks;
  determining APS of the encoded media data bitstream based on the information describing APS.

In an embodiment, the information describing APS comprises a maximum APS buffer size per subpicture track.

In an embodiment, the information describing APS further comprises the identifier of the APS NAL Units present in the APS buffer for each subpicture track.

In an embodiment, the information describing APS comprises an indication of whether APS identifier rewriting is needed for each base track.

In an embodiment, the indication of whether APS identifier rewriting is needed is indicated for each subpicture track referenced in the base track.

In an embodiment, the information describing APS comprises replacement APS identifiers for each subpicture track referenced in a base track.

In an embodiment, the Information describing APS comprises replacement APS identifiers for a subpicture track referenced in a base track when needed.

In an embodiment, the Information describing APS comprises a range of APS identifiers for a subpicture track referenced in a base track when needed.

In an embodiment, the Information describing APS comprises the location of syntax elements referencing APS identifiers in slice headers.

In an embodiment, the Information describing APS is encapsulated into a data structure describing a group of samples of the subpicture tracks.

In an embodiment, the Information describing APS is encapsulated into a data structure describing a group of samples of the base tracks.

In an embodiment, the Information describing APS is encapsulated into at least one metadata track referenced by a subpicture track and/or a base track.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

According to another aspect of the invention there is provided a computer program which upon execution causes the method of the invention to be performed.

According to another aspect of the invention there is provided a device of encapsulating subpicture bitstreams in at least one media file, the subpicture bitstreams corresponding to encoded media data of a subpicture corresponding to a rectangular region of video data, the device comprising a processor configured for:
  obtaining the plurality of subpicture bitstreams;
  encapsulating each subpicture bitstream in a subpicture track;
  generating at least one base track referencing at least two subpicture tracks and forming a spatial arrangement of the at least two subpicture tracks;
  generating information describing APS referenced by samples of the at least two subpicture tracks;
  encapsulating the subpicture tracks, the at least one base track and the information describing APS in the at least one media file.

According to another aspect of the invention there is provided a device of reconstruction of an encoded media data bitstream from at least one media file, the at least one media file comprising subpicture bitstreams, a subpicture bitstream corresponding to encoded media data of a subpicture corresponding to a rectangular region of video data, the device comprising a processor configured for:
  obtaining from the at least one media file a base track referencing at least two subpicture tracks and forming a spatial arrangement of the at least two subpicture tracks;
  obtaining from the at least one media file information describing APS;
  generating the encoded media data bitstream corresponding to the base track from the corresponding subpicture bitstreams associated with the at least two subpicture tracks;
  determining APS of the encoded media data bitstream based on the information describing APS.

At least parts of the methods according to the disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the present disclosure can be implemented in software, the present disclosure can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the disclosure will now be described, by way of example only, and with reference to the following drawings in which.

DETAILED DESCRIPTION OF THE DISCLOSURE

Figure 1:
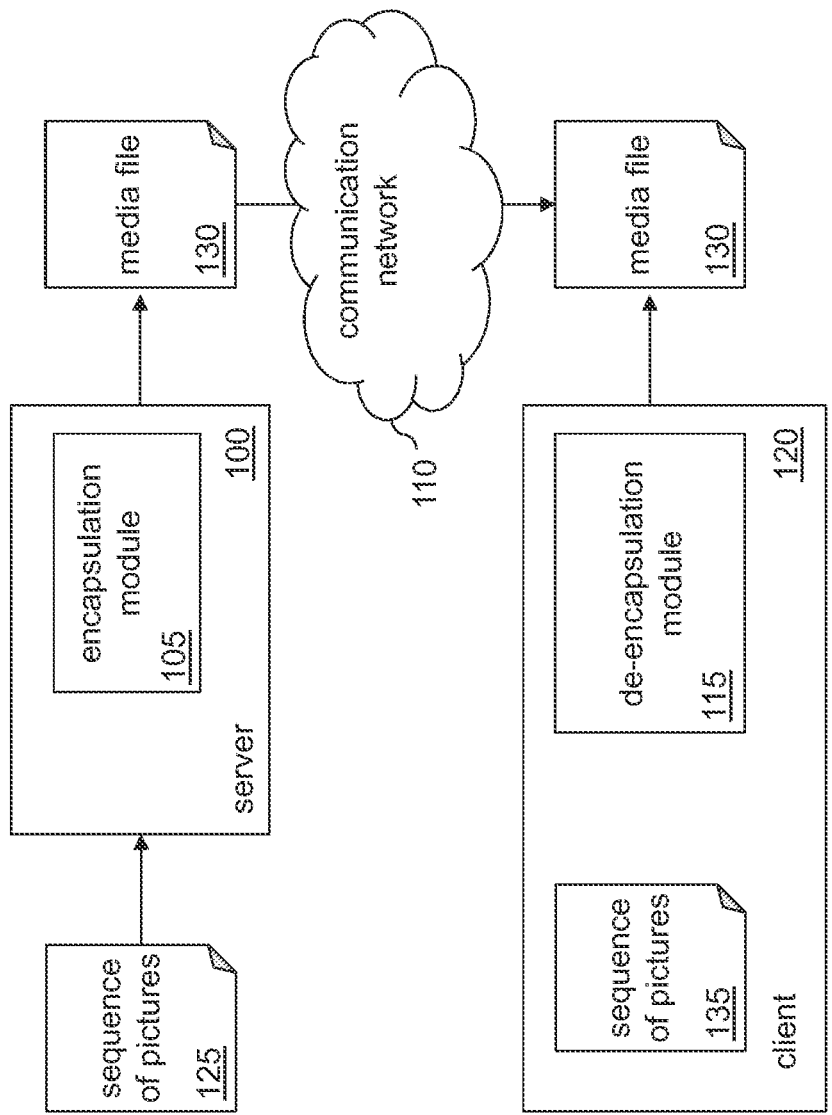
FIG. 1 illustrates an example of streaming media data from a server to a client.

FIG. 1 illustrates an example of streaming media data from a server to a client. As illustrated, a server 100 comprises an encapsulation module 105, connected, via a network interface (not represented), to a communication network 110 to which is also connected, via a network interface (not represented), a de-encapsulation module 115 of a client 110.

Server 100 processes data, e.g. video and/or audio data, for streaming or for storage. To that end, server 100 obtains or receives data comprising, for example, the recording of a scene by one or more cameras, referred to as a source video. The source video is received by the server as an original sequence of pictures 125. The server encodes the sequence of pictures into media data (i.e. bitstream) using a media encoder (e.g. video encoder), not represented, and encapsulates the media data in one or more media files or media segments 130 using encapsulation module 105. Encapsulation module 105 comprises at least one of a writer or a packager to encapsulate the media data. The media encoder may be implemented within encapsulation module 105 to encode received data or may be separate from encapsulation module 105.

Client 120 is used for processing data received from communication network 110, for example for processing the media file, or media files, 130. After the received data have been de-encapsulated in de-encapsulation module 115 (also known as a parser), the de-encapsulated data (or parsed data), corresponding to a media data bitstream, are decoded, forming, for example, audio and/or video data that may be stored, displayed or output. The media decoder may be implemented within de-encapsulation module 115 or it may be separate from de-encapsulation module 115. The media decoder may be configured to decode one or more video bitstreams in parallel.

It is noted that media file 130 may be communicated to de-encapsulation module 115 in different ways. In particular, encapsulation module 105 may generate media file 130 with a media description (e.g. DASH MPD) and communicates (or streams) it directly to de-encapsulation module 115 upon receiving a request from client 120. The media file 130 may also be downloaded by and stored on the client 120.

For the sake of illustration, media file 130 may encapsulate media data (e.g. encoded audio or video) into boxes according to ISO Base Media File Format (ISOBMFF, ISO/IEC 14496-12 and ISO/IEC 14496-15 standards). In such a case, media file 130 may correspond to one or more media files (indicated by a FileTypeBox 'ftyp') or one or more segment files (indicated by a SegmentTypeBox 'styp'). According to ISOBMFF, media file 130 may include two kinds of boxes, a "media data box", identified as 'mdat' or 'imda', containing the media data and "metadata boxes" (e.g. 'moov' or 'moof') containing metadata defining placement and timing of the media data. In a particular embodiment, the sequence of pictures 125 is encoded, or compressed, according to the Versatile Video Codec specification ISO/IEC 23090-3.

The media sequences are encapsulated into tracks. A track is a timed sequence of related samples in an ISO base media file. For media data, a track corresponds to a sequence of images or sampled audio; for hint tracks, a track corresponds to a streaming channel.

Figure 2:
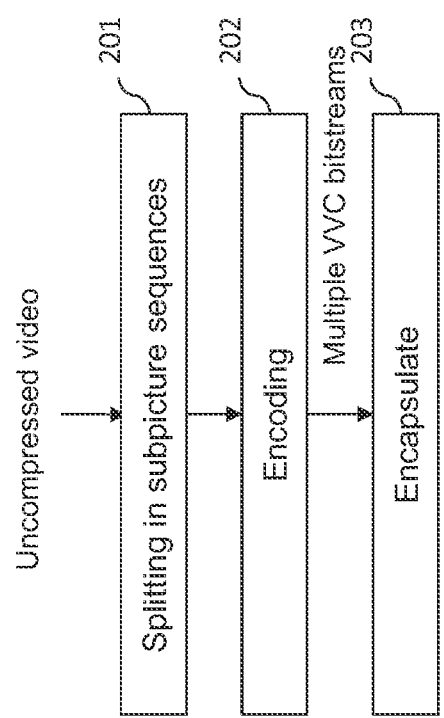
FIG. 2 illustrates the main steps of an encapsulation process of video media content.

FIG. 2 illustrates the main steps of an encapsulation process of video media content where the video frames are divided into a plurality of subpictures. Subpictures are spatial rectangular regions in a picture. Corresponding spatially collocated subpictures in a sequence of pictures constitute a subpicture sequence of video data.

The encapsulation process starts by a step 201 that splits an uncompressed video into subpicture sequences. The input video sequences are divided into rectangular regions of pixels. The regions of pixels are extracted in separate sequences and form a set of subpicture sequences. Then each subpicture sequence is coded in a step 202, for example using VVC coding format. At the end of the coding process, one bitstream, called a subpicture bitstream, is generated for each subpicture sequence.

The coding configurations of the subpicture sequences are synchronised such that all the subpicture bitstreams use the same coding tools. This allows forming a merged bitstream that complies with VVC specification by combining together two or more subpicture bitstreams.

This set of subpicture bitstreams are then encapsulated in step 203 using a file format writer. Typically, the file format writer encapsulates the subpicture bitstreams into different tracks (called subpicture tracks). The file format writer may generate other tracks that reference these subpicture tracks to create new merged bitstreams that form a spatial arrangement of the subpicture sequences.

While the subpicture bitstreams generally correspond to a set of subpictures dividing a same video, this is not mandatory. In some embodiments, the different subpicture bitstreams may be part of different original video sequences.

Figure 3:
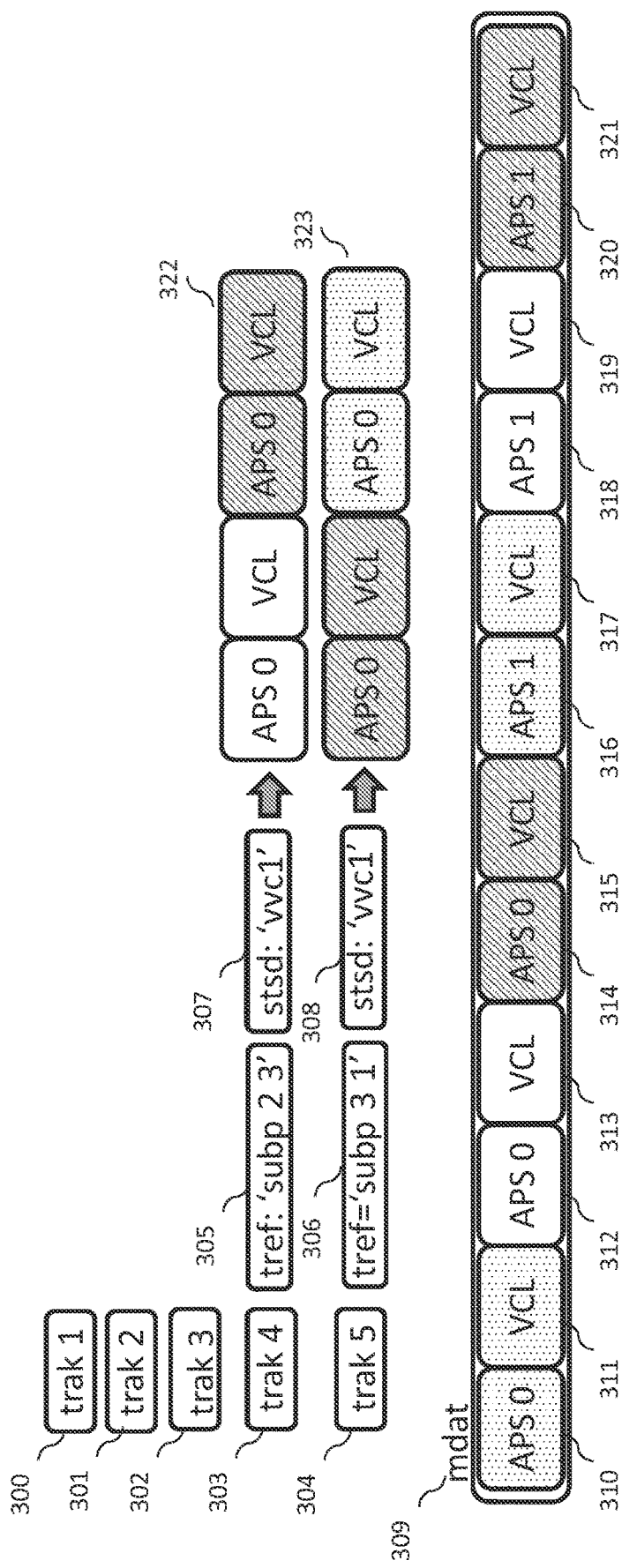
FIG. 3 is an example of ISOBMFF file that comprises three subpicture bitstreams.

FIG. 3 is an example of ISOBMFF file that comprises three subpicture bitstreams. The subpicture bitstreams are encapsulated into three VVC subpicture tracks 300 to 302 accordingly to ISOBMFF specification. The two other tracks 303 and 304 are VVC tracks that form each a merged bitstream from two subpicture tracks (i.e. two subpicture bitstreams). These tracks define 'subp' track references to the subpicture tracks. For example, the tracks 303 refers to the subpicture tracks 2 and 3 according to the 'subp' track references present in the TrackReferenceBox as illustrated in 305. The track 304 refers to the subpicture tracks 3 and 1 using also the 'subp' track references in 306.

As a result, the tracks 4 and 5 are tracks that perform a merging of several subpicture tracks into a single bitstream. These tracks may be named also merged or merging tracks or base tracks. For example, when a VVC track references VVC subpicture tracks, it is also referred to as a VVC base track. A VVC base track may not contain VCL NAL units and may not be referred to by a VVC track through a 'vvcN' track reference.

The mdat 309 of the media file contains the NAL units of each subpicture bitstreams and are described in the metadata boxes of the track 300 to 304. These metadata boxes associate the NAL units in 309 to a sample in a given track. For example:

NAL Units 310, 311 form the first sample of the track 1 referenced 300; and NAL Units 316, 317 form the second sample of the same track.

NAL Units 312, 313 form the first sample of the track 2 referenced 301; and NAL Units 318, 319 form the second sample of the same track.

NAL Units 314, 315 form the first sample of the track 3 referenced 302; and NAL Units 320, 321 form the second sample of the same track.

In this example, each sample of a subpicture tracks is composed of one APS NAL unit (310, 312, 314, 318, 320) and one slice NAL unit (311, 313, 315, 317, 319, 321). Nevertheless, zero or more APS NAL units and one or more slice NAL units may be present in each sample of a subpicture track.

When reconstructing the samples of the merged tracks 303 or 304 as per ISO/IEC 14496-12 and ISO/IEC 14496-15 a problem arises. For example, the first reconstructed sample of each merged track includes APS NAL units with same APS identifier (0 as illustrated in 322 and 323). The problem is that the VVC specification constrains the APSs present in one Picture Unit (equivalent of a sample) with a given identifier and type to have the same content. In the example of the FIG. 3, the subpicture tracks are coded separately. As a result, there is no guarantee that the APSs having the same identifier in the two separate subpicture bitstreams have the same contents.

One of the goals of the disclosure is to address the aforementioned problem.

Figure 4:
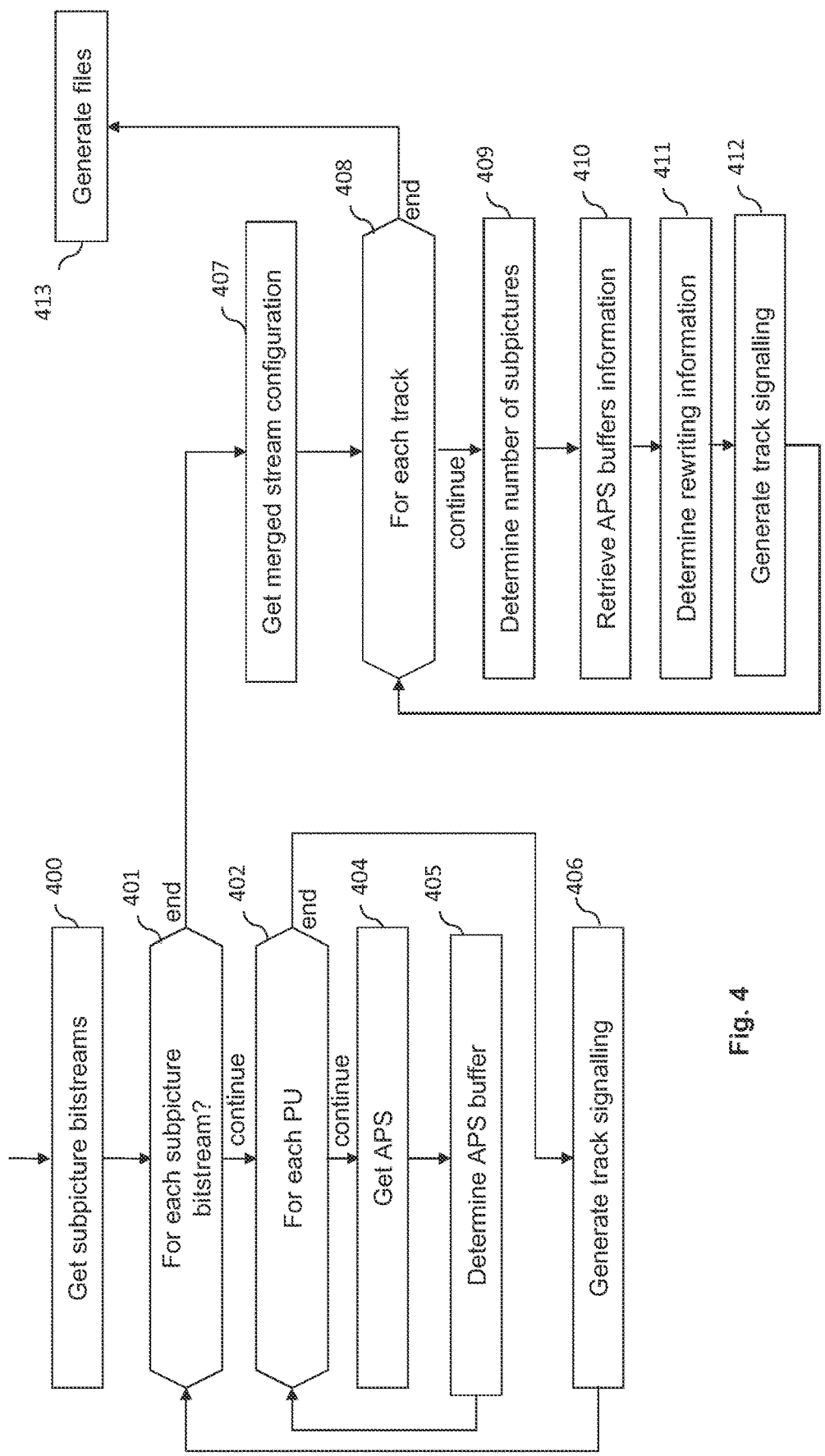
FIG. 4 illustrates the main steps of the encapsulation process of a media file according to some embodiments of the invention.

FIG. 4 illustrates the main steps of the encapsulation process of a media file according to some embodiments of the disclosure. This process may be executed by a media file writer or writer of the encapsulation module 105. First the encapsulation module takes a set of subpicture bitstreams as input in a step 400. These subpicture bitstreams will be encapsulated in an ISO base media file (or segment or fragment). These subpicture bitstreams are coded bitstreams that share common coding configurations permitting the generation of new VVC bitstreams from a selection of these subpicture bitstreams. The new VVC bitstream or so called merged bitstream defines a new VVC subpicture configuration so that each subpicture bitstream is coded as one VVC subpicture.

To allow dynamic creation of this merged bitstream, the ISO BMFF file writer may encapsulate each subpicture bitstream in separate tracks accordingly to ISO/IEC 14496-15. These tracks are also called subpicture tracks. This first phase is illustrated by method steps 401 to 406. A second phase concerns the encapsulation of the merged subpicture tracks, illustrated by method steps 407 to 412.

A processing loop is applied for each subpicture bitstream in a step 401. Each NAL unit forming the subpicture bitstream is parsed to extract information. In particular, it is determined the NAL units forming a picture unit (PU) accordingly to VVC specification. In addition to the regular description process as per ISO/IEC 14496-15, each PU is parsed, in a step 402, to determine information related to APS.

The writer determines the APSs present in the Picture Unit during the step 404. The APS are conveyed in prefix or suffix APS NAL units as per VVC specification. The writer then parses the content of the prefix and suffix APS NAL units to extract the identifier and the type of the APS that are coded by the aps_adaptation_parameter_set_id and aps_params_type syntax elements of VVC specification. In addition, the writer may extract the content of the APS i.e. the coded parameters in the APS. These three items (type, identifier and content) may describe the APS. In a variant, the writer may compute hash value for coded parameters of the APS to have a more compact representation of the APS content.

The writer also parses the NAL units of the sample (e.g. Picture Header NAL unit and slice NAL units) to identify the references made to the APS. These NAL units may refer to the APS using a value corresponding to an identifier of the APS. The semantics of the syntax element that contains the identifier value, permit to determine the type of the APS Thus, the writer determines the identifier and the type of the one or more APSs that are referenced by the VCL NAL units of the Picture Unit. For example, the values of sh_alf_aps_id_luma[i], sh_alf_aps_id_chroma, sh_alf_cc_cb_aps_id and sh_alf_cc_cr_aps_id syntax elements that may be present in the slice headers, correspond to identifiers of ALF APSs in a VVC stream. In the Picture Header NAL unit, the values of ph_alf_aps_id_luma[i], ph_alf_aps_id_chroma, ph_alf_cc_cb_aps_id and ph_alf_cc_cr_aps_id also refer to identifiers of ALF APSs. The NAL units may also refer to other types of APS. For example, ph_scaling_list_aps_id[i] may refer to identifiers of scaling list APS and ph_lmcs_aps_id to identifiers of LMCS APS.

The information (i.e. the APS and the reference to the APS ids) parsed in 404 for each Picture Unit (that may be represented in one sample) permit to describe the content of a buffer of APSs maintained by the decoder at any time. The APS buffer stores the APS that are referenced by the NAL units of the current sample but also the APS that are referenced by NAL units in subsequent sample in decoding order. The writer computes an APS buffer representation of each sample of the subpicture bitstream in a step 405.

For instance, the writer associates a first list of APS referenced in the sample with each sample, since APS buffer content may change at any sample, of each subpicture bitstream. Each item of this list includes the identifier, the type and the parameters (or content, or a hash of the content) of the APSs referenced by the NAL units as determined in 404.

In addition, the writer maintains a second list of APSs associated with each sample that contains the APSs (represented by their type, identifier and content) that are present (i.e. coded) in one NAL unit of the current Picture Unit or sample. In VVC, the APS in a suffix APS NAL unit is not for use by the NAL units that are present in the Picture unit but rather by the NAL unit that follows in another PU. As a result, the writer may not associate the APS in suffix APS NAL unit with the sample that contains the APS NAL unit but it is rather associated with the next sample (Picture Unit). The APS of the suffix APS NAL unit is stored in the second list of the next sample.

The content of the APS buffer for each sample is represented by a third list of APS. For each new sample (or Picture Unit), the writer initializes this third list with the items of the first list (i.e. the APS referenced by the NAL units of the current sample). Then, for each NAL unit of the sample that references an APS, the writer applies the following process. When the first list of referenced APS contains an APS (represented by type, identifier and content values) that is not in the second list (i.e. the APS coded in the sample), the writer successively adds the APS in the third list associated with the previous samples. This process ends when either one of the following conditions is verified: the APS is either already present in the third list (i.e. the list of referenced APS in the sample) or the APS is in the second list of APSs present in the sample.

As a result, the writer builds at the end of step 405 a lists of APSs (the third list) that corresponds to the APS buffer. For each sample, this list contains the minimal set of APSs needed to decode the sample and the following samples in decoding order.

Once all the PUs of the subpicture bitstream are processed, the writer performs the encapsulation of the subpicture bitstream NAL units in one subpicture track in a step 406. The NAL units of each Picture Unit are stored in a 'mdat' box and described in VVC subpicture track. This signalling step includes the signalling of the subpicture tracks configuration and the description of the samples present in the subpicture bitstream.

In addition, the writer may signals information related to the subpicture track in a step 406. In some embodiments described later on, the information may describe the size of the buffer and/or the list of APS identifiers in use for some samples of the subpicture track or a description of the APS buffer.

Once the subpicture bitstreams are processed and therefore are signalled as a subpicture track in the media file, the writer generates the tracks that represent a composition of one or more subpicture track. In ISO/IEC 14496-15, these tracks are for example VVC tracks or VVC base tracks that contain 'subp' track references to the subpicture tracks that are part of the merged bitstream. In this document, the merging or merged tracks are for example these VVC tracks.

The merger determines, in a first step 407, the configuration of the subpicture merged bitstream, namely the list of the subpictures that are present in the merged bitstream. This information is provided as an input of the writer. Typically, the content provider knows in advance the set of merged bitstreams that he would like to provide in the media file. Typically, this is a list of subpicture bitstreams associated with a layout. The layout of the subpicture merged bitstream is determined from the information provided and is used to generate new SPS and PPS for the merged bitstream. For example, the SPS contains the layout of the VVC subpictures such that each VVC subpicture corresponds to one subpicture of the merged bitstream.

During the step 407, the parser may determine that the configurations of two subpicture bitstreams are incompatible when the coding tools configurations described in the SPS or PPS of the subpicture bitstreams describe different coding configurations (excluding the subpicture and slice partitioning information that are allowed to differ). Two coding tools configurations are compatible if the coding tools configuration of one subpicture bitstream (as described in parameter sets NAL unit such as the VPS, SPS, PPS and Picture Headers) may also apply to another subpicture bitstream while ensuring a correct decoding of the encoded pictures. In addition the coding configuration are compatible if it is possible to generate new SPS and PPS configuration that apply to the merged bitstream while ensuring that each subpicture is correctly decoded.

When the configurations are compatible, the writer employs the step 408 to 412 to encapsulate the merged bitstreams in different tracks, one VVC track for each merge bitstream.

The writer applies successively the step 409 to 412 in a processing loop 408 for each track corresponding to a merged bitstream. This processing loop starts by step 409 that gets the number of subpicture tracks referenced by the merging track. For each subpicture track, the writer retrieves (410) the APS buffer representation computed in 405. The APS buffer information associated to each subpicture makes it possible to determine if APS identifiers conflicts occur. This may happen in particular when one or more subpictures have an APS with same type and identifier but different content in its APS buffer for a given sample of the merged bitstream.

In some embodiments described hereinafter, the writer may determine new APS identifiers for each subpicture in a step 411 when the one or more subpictures have two APS with same type and identifier but different content in their APS buffer for a given sample.

In such a case, the writer computes the maximum size of the APS buffer (represented by max_aps_buffer_size[i] variable for the i-th subpicture) for each subpicture bitstream. This maximum size is the maximum number of APSs present in the APS buffer for all the samples of the subpicture track. The writer may use the APS buffer description determined in 405 and optionally signalled in the subpicture track description made in 406 to compute this number. It is to be noted that the maximum number of different APS needed to encode a given bitstream determines the number of different APS identifiers needed to identify these APS. This is made for each type of APS, as typically, each type of APS is associated with its own identifiers.

Then, the writer distributes the range of APS identifiers among the subpicture track such that each track can represent N different APSs wherein N is equal to the maximum size of the APS buffer for the subpicture bitstream.

The following equation may be used to compute the start and end range of APS identifiers for each subpicture ranges. The num_subpicture variable is the number of subpicture bitstreams or tracks that form the merged bitstream. The start_range_id[i] and end_range_id[i] variables represent respectively the start and the end of the range of APS identifiers for the i-th subpicture referenced by the merged track. This variable is computed for each APS type separately when the different types of APS use different value spaces for the APS identifiers.

```
for (i = 0; i < num_subpicture; i ++) {
    if (i > 0)
        start_range_id[i] = end_range_id[i-1] + 1
    else
        start_range_id[i] = 0
    end_range_id[i] = start_range_id[i] + max_aps_buffer_size[i] - 1
}
```

For example, the writer describes a track that references two subpicture bitstreams. The first subpicture bitstream has a maximum APS buffer size equal to 3 and the second subpicture bitstream a maximum size of 2. In such a case, the writer may attribute the range of APS id [0, 2] and [3, 4] for the second subpicture bitstream.

The maximum range of APS identifiers may be restricted. In such case, the writer may check that the end range for the last subpicture is within the range of the restricted APS identifiers. For example, VVC specification restricts the range of ALF APS identifiers from 0 to 7, inclusive. As a result, an end_range_id[i] greater than 7 indicates that the merged bitstream would use too many APSs and would not produce a compliant bitstream. In such cases, the writer may raise an exception and signal that the merged bitstream is not compliant with codec constraint. In a variant, the writer may abort the encapsulation process of the merged track.

This method to allocate separate ranges of APS identifiers to each subpicture track for the merged track permits to solve the conflict i.e. avoid having two APS with same APS identifier and type, and also different content in a sample of the merged bitstream.

When there is no APS with same identifier, same type but different contents in the samples of the merged track, the writer may skip the generation of new APS identifiers.

These ranges of APS identifiers for each subpicture track can be used to generate a list of replacement values for APS identifiers of the APS in the subpicture track. For instance the following process can be used to associate an identifier in the predetermined range with the APS of the subpicture track.

The encapsulation defines the new_aps_id[i][j] variable as the replacement identifiers for the APS with original identifier equal to j in the i-th referenced subpicture track. The aps_id_state[i][j] variable indicates the status of the j-th replacement identifier for the i-th subpicture. When aps_id_state[i][j] equal to '−1' it means that the replacement identifier equal to j in the i-th referenced subpicture track cannot be used. When equal to 0, it means that the replacement identifier equal j is free to use and equal to 1 means it is already in use to replace the identifier of another APS identifier.

The writer initializes this variable for each i-th referenced subpicture track, as follows when processing the first sample of the media sequence; wherein max_num_aps_id is the maximum allowed APS identifiers values per specification:

```
for (j=0; j<max_num_aps_[id]; j++) {
    new_aps_id[i][j] = -1
    aps_id_state[i][j] = -1;
}
for (j=start_range_id[i]; j<=end_range_id[i]; j++) {
    aps_id_state[i][j] = 0
}
```

The principle of the above equation, is to initialize new_aps_id[i][j] with a value −1 that represents an impossible value of APS identifier; and to initialize the aps_id_state[i][j] to 0 for the identifiers in the allowed range (as determined above) and to −1 for values outside the range.

At the beginning of processing of a sample, each APS present in the APS buffer (for a given type) is attributed a new identifier as follows wherein cld is the original identifier of the APS and the new_id is the replacement identifier value for the APS.

```
if (new_aps_id[i][cld] != -1)
    new_id = new_aps_id[i][cld]
else {
    for (j=start_range_id[i]; j<=end_range_id[i]; j++) {
        if (aps_id_state[i][j] == 0) {
            new_aps_id[i][cld] = j
            aps_id_state[i][j] = 1
            new_id = new_aps_id[i][cld]
        }
    }
}
```

In addition, the state of usage of the replacement identifier (represented by the variable aps_id_state[i][j]) is updated at each sample before determining the new identifier for the APS. Indeed, some APS may have been removed from the APS buffer when not useful anymore. The principle of this update is to determine the APS identifiers that were present in the APS buffer in the previous sample and that are not present anymore for the current sample. The number of these APS identifiers is represented by the variable num_removed_APS_ids. The variable removed_APS_id[i] is the identifier of the i-th removed APS. The update of the variables aps_id_state[i][j] and new_aps_id[i][j] is handled by the following equation:

```
for (k=0; k<num_removed_APS_ids; k++) {
    id = new_aps_id[i][removed_APS_id[k]]
    aps_id_state[id] = 0
    new_aps_id[i][removed_APS_id[k]] = -1
}
```

In practice, the processing described in previous section is applied for each type of APS. Thus each APS type is treated separately with different variables (e.g. for aps_id_state[i][j], start_range_id[i], end_range_id[i], new_aps_id[i][j]) that are maintained in memory for each type of APS.

Finally, the writer performs (in a step 412) the encapsulation of the merged track by creating a VVC track that uses 'subp' track references that refer to the subpicture tracks. The samples (or the sample entry) of the merged track may include parameter set (VPS, SPS, PPS . . . ) NAL units that have been design to generate a compliant VVC stream with subpicture (one corresponding to each subpicture track). The writer may signal this rewriting information (i.e. the APS identifier ranges for merging the bitstream) in the one or more boxes of the file format in a step 412. Different embodiments will be described in details below.

The writer may store the encapsulated tracks into one or more file in a step 413.

It is to be noted that the encapsulation described by reference to FIG. 2 may also apply to a media file that is already encapsulated. Accordingly, instead of reading access units from an input video bitstream (steps 400), samples are read from an encapsulated file previously received. The encapsulated file may contain one or more subpicture tracks and zero or more merged tracks. The encapsulation still determines the APS buffer in step 404, and 405 for each subpicture tracks and may include additional signalling in the media file 406 to the existing subpicture tracks.

This enables an initial encapsulation that was not providing the merging tracks. An application may add the merged tracks in a second phase.

Accordingly, the encapsulation method is separated into two different phases. During the first phase, the subpicture bitstreams are encapsulated individually into subpicture tracks. During the encapsulation, the use of APS by each subpicture bitstream is monitored. Accordingly, a different range of APS identifiers may be determined for each subpicture bitstream. In a second phase, the merged subpicture bitstreams are encapsulated. During this second phase, APS with same identifiers, same types and different content in a sample of timed-align sample of subpicture track referenced by the merged track are detected. Based on monitoring of APS made during the second phase, some rewriting information describing a rewriting of the APS identifiers in each merged bitstream may be determined if needed. This rewriting information is signalled in the media file to be used at decoding to obtain a compliant merged bitstream without APS with same identifier, same type but different content.

Figure 5:
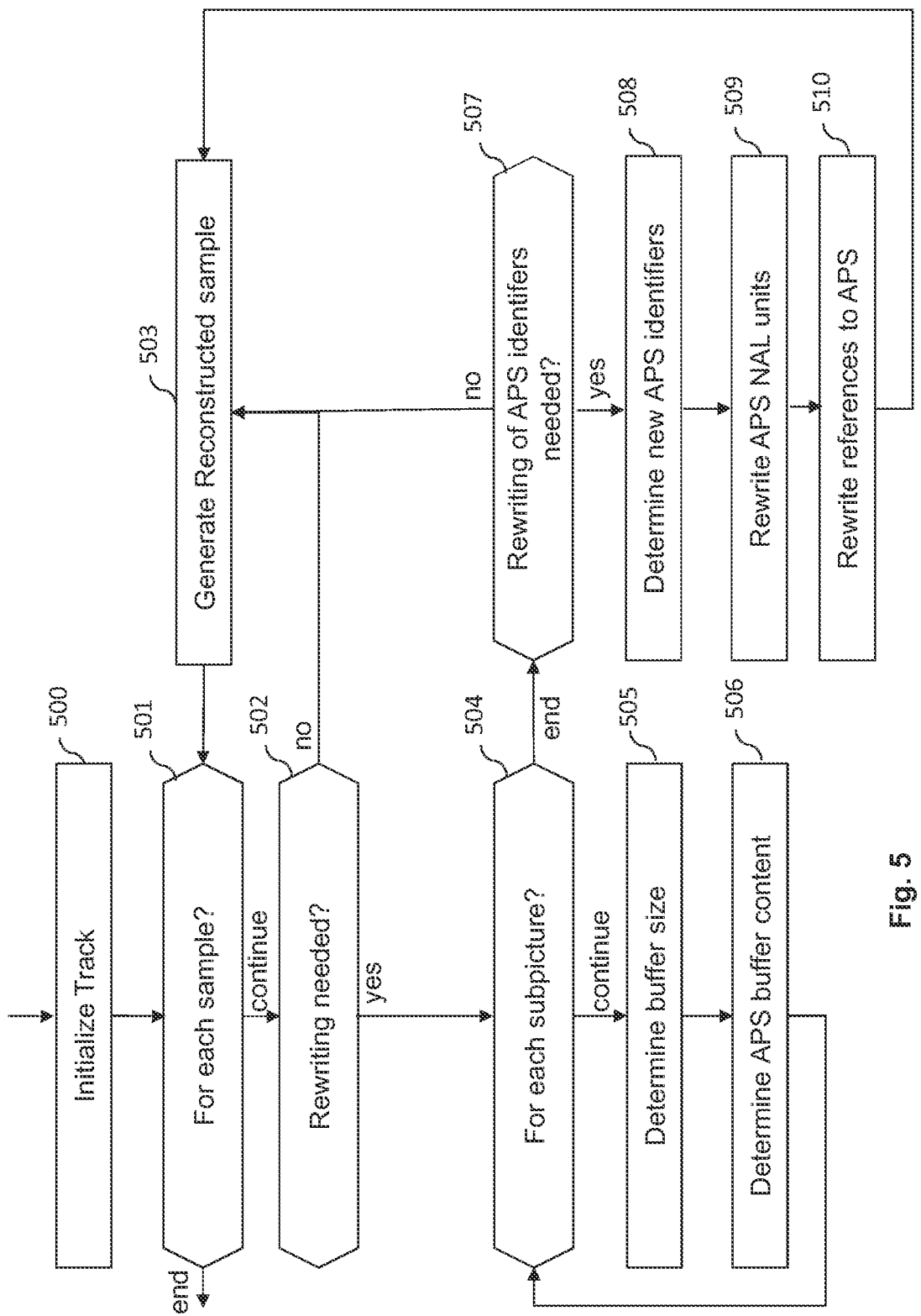
FIG. 5 illustrates the main steps of the reading of the media file of a client according to embodiments of the invention.

FIG. 5 illustrates the main steps of the reading of the media file of a client according to embodiments of the disclosure. The reading process consists in reconstructing the picture units of the media sequence described by one of the tracks in the media file. The media file may contain one or more tracks. The client or the user may select one or more tracks to play. For each selected track, the reconstruction process of FIG. 5 applies when the track corresponds to a merging operation of one or more subpictures, typically represented in different subpicture tracks.

The client first initializes the track to be decoded in a step 500. The initialization consists in parsing the file format boxes associated with the selected track in particular the TrackReferenceBox. This box may contain 'subp' references to one or more other subpicture tracks. These references indicate that the selected track samples are reconstructed from one or more subpicture tracks.

The number of referenced subpicture tracks in the bitstream may be equal to the number of 'subp' track references in the merged track. It may also be specified by a 'spor' sample group. It can be also the number of reference subpicture tracks with a 'recr' track reference associated with the selected track (or base track or merged track). It may also be specified by a 'rror' sample group.

When reconstructing the samples of a track that references subpicture tracks, a problem may arise when the samples of subpicture tracks have APS NAL units that are referenced by slices or picture header NAL units. When these APSs have the same type and identifier, the reconstruction of the merging tracks needs to fix the identifiers of APSs and then to update how the slices and picture header NAL unit refer to these APS with fixed identifiers. In other words, some of the APS identifiers may need to be rewritten with new identifiers, the rewriting needs to be done in both the APS NAL Unit itself, and in the different headers in VCL NAL Units that may refer to this APS.

As a result, for each sample (the processing loop is managed in step 501) the parser first determines in a step 502 whether the samples may or may not require resolving conflicts of APS identifiers. This optional early checking step gives the possibility to avoid analysing the content of the APS buffer in search for conflicts of identifiers.

In some embodiments of the disclosure, the parser determines from signalling associated with the samples of the merging track, such as a sample group, whether the rewriting of APS identifiers is necessary. When not necessary, the parser skips other processing steps for fixing conflicts of APS identifiers and directly reconstructs the sample NAL units from the subpicture tracks. The parser reconstructs the sample in a step 503 as per reconstruction process described in ISO/IEC 14496-15. The principle of this reconstruction is to extract the NAL units of the timed-align sample in the subpicture tracks. The parser may also reorder the NAL units to form a conformant bitstream that provides first the prefix non-VCL NAL unit (e.g. the prefix APS NAL units) followed by the VCL NAL units and finally the suffix non-NAL units (e.g. the suffix APS NAL units).

In a variant, the parser gets information from Parameter Sets NAL units (present either in the current sample or in the sample entries) that the coding tools that may convey parameters in APS NAL unit are disabled. This means that the decoding of the merged bitstream does not require APS provided parameters. For example, if the ALF is disabled for the videos sequence (as stated by sps_alf_enabled_flag of the SPS), the ALF APS would not present in the bitstream. There is no need to decode any APS potentially present in the bitstream. In such case, the parser reconstructs directly the samples in 503.

In another variant, the parser systematically checks in details if APS conflicts occur by analysis of the APS buffers content.

The determination of the APS NAL units present and referenced in subpicture tracks sample, may be done as follows.

When rewriting of APS identifiers is needed in step 502, the parser applies in a step 504 a processing loop for each subpicture track that contains NAL units to reconstruct the current sample of the merged track. For each step of this processing loop, the parser determines the size of the APS buffer of the subpicture track for this sample in a step 505. The APS buffer contains the minimal set of APSs that are needed for decoding of the subpicture sample and decoding of the subsequent samples in decoding order. There are different way to determine the number of APS NAL units present and referenced in subpicture tracks sample, comprising:

In one embodiment, the number of APS in the APS buffer (i.e the size of the APS buffer) may be present in the signalling associated with the samples of the subpicture tracks.

In another embodiment, the number of APS in the APS buffer (i.e the size of the APS buffer) is computed similarly to the process done by the encapsulation module i.e. by parsing the NAL unit present in the sample. The processing is for example similar to the one implemented in 405 at encoding.

In addition to the size of the APS buffer, the parser stores in memory the content of the APS buffer at this sample in a step 506. The content of the APS buffer is the list of the APS identifiers, types and APS parameters contained in the APS buffer. There are different way to determine the content of the APS buffer comprising:

In some embodiments of this disclosure, the APS buffer content is determined from signalling associated with each subpicture merged track (e.g. sample group or metadata track sample).

In other embodiments, the parser applies the same processing as made by the encapsulation in steps 401 to 405 on the samples of the subpicture tracks.

At the end of the processing loop applied for each subpicture track associated with the sample, the parser has in memory a description of the APS buffer for each subpicture track.

The de-encapsulation process continues which checking step 507 that determines if rewriting of the APS identifiers in the NAL unit of the reconstructed sample is necessary.

In some embodiments of this disclosure, the rewriting of APS identifier in the reconstructed picture unit is decided from the signalling associated with merged track.

In other embodiments, the parser has to determine it by analysing the content of the APS buffers associated with each subpicture tracks.

The principle of this checking step is to confirm that APS buffers of all the referenced subpicture tracks contain APSs with different identifiers and types when they convey different parameters. When this condition is verified there is no conflict of APS identifiers between the different subpictures tracks. The merged sample does not need rewriting of APS identifiers to generate a compliant picture unit as per VVC specification (with the additional constraint that the parameters of SPS and PPS of each subpicture track are similar and compatible for merging the samples of subpicture track). Otherwise, at least one APS in each APS buffers of two different subpicture tracks have same identifier and type values but different content (i.e. different parameters). The reconstruction operations have to fix this issue.

For example, if the selected track merges two subpicture tracks. In one sample, both APS buffers of the two subpicture track store a single ALF APS for a given sample of the media. No APS identifiers rewriting is needed if either of the identifiers of the APSs are different; or if the identifiers of the APSs are the same and the APS have the same content. The parser has to change the APS identifiers in one of the two subpictures when the APS identifiers are equal but the APS contents are different.

The change of APS identifiers for the current sample consists in three successive steps 508, 509 and 510. The parser determines new identifiers of APS that will replace the APS identifier that conflicts.

In some embodiment of this disclosure, the file format comprises list of APS identifiers associated with the merging track generated by the encapsulation. In such a case, the APS identifier value that replaces the original APS identifier value is determined from the boxes of the file format.

In a variant, the computation of the new APS identifiers follows the same algorithm as in the step 411 of the encapsulation process.

At the end of step 508, the parser associates for each sample of the subpicture tracks, a replacement value for each identifier of APS present in the APS buffer. The parser reuses the same replacement value for an APS with a given identifier and type, for all the sample that refer to this APS. This value can be changed when the APS is updated with new content in a one sample.

The parser then uses the replacement values to modify the APS NAL units that are present in the time-aligned sample of the subpicture tracks as follows:

If the NAL unit contains an APS, the parser replaces in a step 509 the value of the aps_adaptation_parameter_set_id syntax element of the APS with the replacement value determined in 508 for the subpicture. For example, if the replacement value of the ALF APS with the original identifier equal to 2 is the value 3 as determined in 508. When encountering an ALF APS with aps_adaptation_parameter_set_id equal to 2, the parser modifies the NAL unit by replacing the value of aps_adaptation_parameter_set_id with the value 3.

If a NAL unit contains a reference to the APS, the value of the reference to the APS identifier is replaced accordingly to the value determined in 508 for the subpicture. Continuing with the previous example, the parser founds a slice with sh_alf_aps_id_luma[i] equal to 2 which corresponds to a reference to an ALF APS with an identifier equal to 2. Then, the parser rewrites the value of sh_alf_aps_id_luma[i] with the value 3. As a result, the ALF APS with identifier 2 is replaced by a new ALF APS with identifier equal to 3. The references to this APS are modified accordingly.

When the parser finishes applying this process to all the subpicture track samples associated with the current sample of the merged track, the parser finally reconstructs the sample in a step 503. It consists in forming a picture unit composed of the NAL units (possibly modified by the rewriting process) present in the merged track and in the time aligned sample of the referenced subpicture tracks accordingly to the ISO base media file reconstruction process of ISO/IEC 14492-15 specification. In particular, the parser may reorder the prefix APS NAL unit retrieved from the subpicture tracks (the APS NAL units may be in a non-VCL track associated with the subpicture track) such that the prefix APS NAL units are prior to the first VCL NAL unit in the Picture Unit of the merged sample.

Based on this general description, different embodiments are described below in details.

According to a first embodiment, the maximum APS buffer size per subpicture track is signalled in the bitstream. The media file signals the maximum APS buffer size per subpicture track in the file format. The signalling is made, for example, in a sample group entry of the SampleGroupDescriptionBox to allow changing dynamically the APS information associated with the samples within the media. If the information is static for the whole media file it can be also defined in a sample entry of the SampleDescriptionBox or a sample group declared as static. In the following, the embodiments are described as a sample group but the new syntax elements may alternatively be provided in sample entries.

Figure 6:
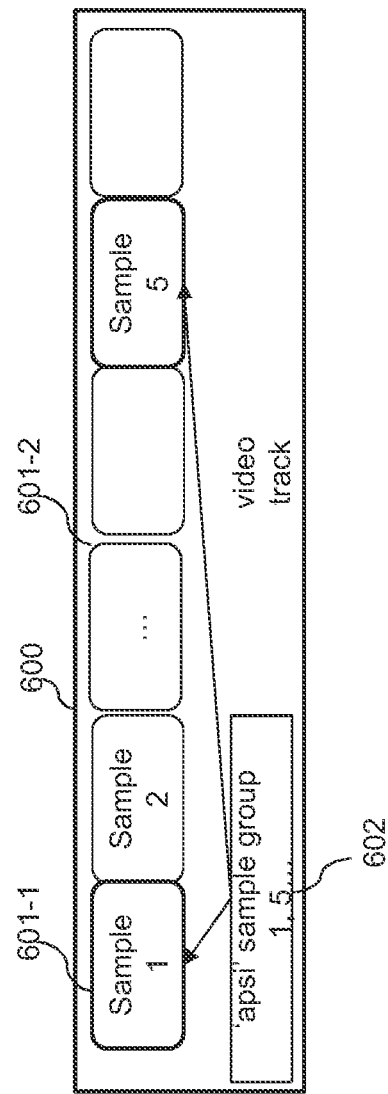
FIG. 6 illustrates a video track that contains several samples.

The encapsulation module may generate the sample group in step 406 and then associates the sample group to the sample present in the subpicture track of the media file. For example, FIG. 6 illustrates a video track 600 that contains several samples 601-1 to 601-2. This video track signals a sample group 602 that is associated to the sample 601-01 to 601-2.

The de-encapsulation module may parse the sample group in a step 505 associated with the current sample to determine the maximum size of the APS buffer.

In a first alternative, the maximum size of APS buffer is signalled within the VvcSubpicIDEntry 'spid' sample group. This sample group is associated with samples of a subpicture track in an ISO base media file and contains information related to the VVC subpictures in the subpicture track. The syntax of the 'spid' sample group may become the following (changes in bold).

```
aligned(8) class VvcSubpicIDEntry( ) extends VisualSampleGroupEntry('spid') {
  unsigned int(1) rect_region_flag;
  unsigned int(1) subpic_aps_info_flag;
  bit(1) reserved = 0;
  unsigned int(1) continuous_id_flag;
  unsigned int(12) num_subpics_minus1;
  for (i = 0; i <= num_subpics_minus1; i++) {
    if ((continuous_id_flag && i == 0) || !continuous_id_flag)
      unsigned int(16) subpic_id[i];
    if (rect_region_flag)
      unsigned int(16) groupID[i];
  }
  if (subpic_aps_info_flag) {
    unsigned int(3) subpic_max_alf_aps_buffer_size;
    bit(5) reserved = 0;
  }
}
``` wherein:

subpic_aps_info_flag equal to 0 specifies that no APS information is provided for the VVC subpictures contained in the sample mapped to this sample group description entry.

subpic_aps_info_flag equal to 1 specifies that APS information is provided for the VVC subpictures contained in the sample mapped to this sample group description entry.

subpic_max_alf_aps_buffer_size specifies the maximum number of ALF APSs present in the APS buffer for the sample mapped to this sample group. This syntax element is coded on 3 bits since VVC currently restricts the number of ALF APS in the APS buffer to 8. In a variant, the length of the subpic_max_alf_aps_buffer_size is set equal to the ceiling of log 2 of the maximum number of allowed APSs.

With this modified syntax, the VvcSubpicIDEntry 'spid' provides signalling of the size of the APS buffer size as determined in step 405 for the current subpicture track for ALF APS type.

In a variant, the maximum size of the buffer is defined per VVC subpictures present in the sample mapped to the sample group description entry since some APSs may be useful only for slice NAL units in a specific VVC subpicture. The syntax of the modified 'spid' sample group is following:

```
aligned(8) class VvcSubpicIDEntry( ) extends VisualSampleGroupEntry('spid') {
  unsigned int(1) rect_region_flag;
  unsigned int(1) subpic_aps_info_flag;
  bit(1) reserved = 0;
  unsigned int(1) continuous_id_flag;
  unsigned int(12) num_subpics_minus1;
  for (i = 0; i <= num_subpics_minus1; i++) {
    if ((continuous_id_flag && i == 0) || !continuous_id_flag)
      unsigned int(16) subpic_id[i];
    if (rect_region_flag)
      unsigned int(16) groupID[i];
    if (subpic_aps_info_flag) {
      unsigned int(3) subpic_max_alf_aps_buffer_size[i];
      bit(5) reserved = 0;
    }
  }
}
``` wherein the semantic of subpic_aps_info_flag remains unchanged.

subpic_max_alf_aps_buffer_size[i] specifies the maximum number of ALF APSs present in the APS buffer for the i-th subpicture for the sample mapped to this sample group description entry.

In one alternative of this embodiment, the signalling of the APS information is made in a dedicated APSInformationEntry sample group that conveys information related to APS. The syntax is alike the modified 'spid' sample group of the first alternative of this embodiment. For example, the syntax of this new sample group is the following:

```
aligned(8) class APSInformationEntry( ) extends VisualSampleGroupEntry('apsi') {
  unsigned int(1) subpic_aps_info_flag;
  bit(7) reserved = 0;
  if (subpic_aps_info_flag) {
    unsigned int(3) subpic_max_alf_aps_buffer_size;
    bit(5) reserved = 0;
  }
}
```

The semantics associated to subpic_aps_info_flag and subpic_max_alf_aps_buffer_size remains the same.

In a variant, the maximum size of the buffer is defined per VVC subpicture present in the sample mapped to this sample group description entry, since some APSs may be useful only for specific subpictures. The syntax of the modified 'apsi' sample group is following:

```
aligned(8) class APSInformationEntry( ) extends VisualSampleGroupEntry('apsi') {
  unsigned int(1) subpic_aps_info_flag;
  bit(3) reserved = 0;
  unsigned int(12) num_subpics_minus1;
  if (subpic_aps_info_flag) {
    for (i = 0; i <= num_subpics_minus1; i++) {
      unsigned int(3) subpic_max_alf_aps_buffer_size[i];
      bit(5) reserved = 0;
    }
  }
}
```

The semantics associated to subpic_aps_info_flag and subpic_max_alf_aps_buffer_size[i] remains the same. num_subpics_minus1 plus 1 specifies the number of VVC subpictures contained in the sample mapped to this sample group description entry.

According to a second embodiment, the APS buffer characteristics for each subpicture tracks is signalled in the media file.

In this embodiment, additional information related the APS buffer is associated with the samples of the subpicture tracks. This additional information describes the content of the subpicture bitstreams.

The encapsulation module may generate the sample group in step 406 and then associates the sample group to the samples present in the subpicture track of the media file. The additional information associated with the sample of the subpicture bitstream may be computed in step 405.

The de-encapsulation module may parse the sample group in a step 506 associated with the current sample to determine the content of the APS buffer.

In a first alternative, the AIPS buffer content is signalled within the VvcSubpicIDEntry 'spid' sample group. This sample group is associated with samples of a subpicture track in an ISO base media file and contains information related to the subpicture track. The syntax of the 'spid' sample group may become the following (changes in bold).

```
aligned(8) class VvcSubpicIDEntry( ) extends VisualSampleGroupEntry('spid') {
  unsigned int(1) rect_region_flag;
  unsigned int(1) subpic_aps_info_flag;
  bit(1) reserved = 0;
  unsigned int(1) continuous_id_flag;
  unsigned int(12) num_subpics_minus1;
  for (i = 0; i <= num_subpics_minus1; i++) {
    if ((continuous_id_flag && i == 0) || !continuous_id_flag)
      unsigned int(16) subpic_id[i];
    if (rect_region_flag)
      unsigned int(16) groupID[i];
  }
  if (subpic_aps_info_flag) {
    unsigned int(3) subpic_alf_aps_buffer_size;
    bit(5) reserved = 0;
    for (j = 0; j < subpic_alf_aps_buffer_size; j++) {
      unsigned int(3) subpic_alf_aps_id[j];
      bit(5) reserved = 0;
    }
  }
}
```

With the semantics of subpic_aps_info_flag remaining the same.

The subpic_alf_aps_buffer_size specifies the number of ALF APSs present in the APS buffer for the sample mapped to this sample group description entry. This syntax element is coded on 3 bits since VVC currently restricts the number of ALF APSs in the APS buffer to 8. In a variant, the length of the subpic_alf_aps_buffer_size is set equal to the ceiling of log 2 of the maximum number of APS allowed.

subpic_alf_aps_id[j] specifies the identifier of the j-th ALF APS present in the APS buffer for the sample mapped to this sample group description entry. The length in bits of this syntax may be determined in function of the authorized range of the APS identifiers. For example, for VVC ALF APS the range is 0 to 7, and thus 3 bits are used.

In a variant, the content of the APS buffer is specified per VVC subpicture and the sample group is modified to signal subpic_alf_aps_buffer_size and subpic_alf_aps_id[j] per subpicture. The syntax may become the following:

```
aligned(8) class VvcSubpicIDEntryy( ) extends VisualSampleGroupEntry('spid') {
    unsigned int(1) rect_region_flag;
    unsigned int(1) subpic_aps_info_flag;
    bit(1) reserved = 0;
    unsigned int(1) continuous_id_flag;
    unsigned int(12) num_subpics_minus1;
    for (i = 0; i <= num_subpics_minus1; i++) {
        if ((continuous_id_flag && i == 0) || !continuous_id_flag)
            unsigned int(16) subpic_id[i];
        if (rect_region_flag)
            unsigned int(16) groupID[i];
        if (subpic_aps_info_flag) {
            unsigned int(3) subpic_alf_aps_buffer_size[i];
            bit(5) reserved = 0;
            for (j = 0; j <= subpic_alf_aps_buffer_size[i]; j++) {
                unsigned int(3) subpic_alf_aps_id[i][j];
                bit(5) reserved = 0;
            }
        }
    }
}
```

The subpic_alf_aps_buffer_size[i] specifies the number of ALF APSs for the i-th subpicture that are present in the APS buffer for the sample mapped to this sample group description entry.

subpic_alf_aps_id[i][j] specifies the identifier of the j-th ALF APS present in the APS buffer for the i-th subpicture of the sample mapped to this sample group description entry. The length in bits of this syntax element may be determined in function of the allowed range of APS identifiers. For example, for VVC ALF APS the range is 0 to 7, and thus 3 bits are used.

The parser may use the list of APS identifiers that are present in the APS buffer of a subpicture track, to determine if the ranges of APS identifier overlap. If all the subpicture tracks referenced by the merged track have non-overlapping ranges, the parser may determine in step 502 that no rewriting is needed.

Instead of extending the 'spid' sample group, the encapsulation process may alternatively signal the set of APS identifiers present in the APS buffer in the 'apsi' sample group of the previous embodiment.

The new version of the 'apsi' sample group is the following when the identifiers are specified for all the VVC subpictures in the sample mapped with the sample group description entry.

```
aligned(8) class APSInformationEntry( ) extends VisualSampleGroupEntry('apsi') {
    unsigned int(1) subpic_aps_info_flag;
    bit(7) reserved = 0;
    if (subpic_aps_info_flag) {
        unsigned int(3) subpic_max_alf_aps_buffer_size;
        unsigned int(3) subpic_alf_aps_buffer_size;
        bit(2) reserved = 0;
        for (j = 0; j <= subpic_alf_aps_buffer_size; j++) {
            unsigned int(3) subpic_alf_aps_id[j];
            bit(5) reserved = 0;
        }
    }
}
```

The semantics of the subpic_alf_aps_buffer_size and subpic_alf_aps_id[j] are the same.

In a variant, the subpic_alf_aps_buffer_size and subpic_alf_aps_id[j] are signalled per VVC subpicture using similar syntax as previous embodiments. An additional syntax element signals the number of subpictures in the sample mapped with the sample group description entry and then the size of the APS buffer and the identifiers of the APS are signalled.

In yet another alternative, the encapsulation may signal the APS identifiers in a new sample group description entry that is associated to the samples of a subpicture track. For instance, the APSBufferInformationEntry 'apbi' sample group may signal the APS identifier. The syntax elements introduced in the exemplary syntax that follows share the same semantics as in previous alternative.

```
aligned(8) class APSBufferInformationEntry( ) extends VisualSampleGroupEntry('apbi') {
    unsigned int(1) subpic_aps_info_flag;
    bit(7) reserved = 0;
    if (subpic_aps_info_flag) {
        unsigned int(3) subpic_alf_aps_buffer_size;
        bit(5) reserved = 0;
        for (j = 0; j <= subpic_aps_buffer_size; j++) {
            unsigned int(5) subpic_alf_aps_id[j];
            bit(3) reserved = 0;
        }
    }
}
```

In a variant, the 'apbi' sample group may signal the APS identifiers per VVC subpicture using similar signalling as in previous alternatives i.e. based on the signalling of the number of subpicture present in the sample followed by loop for each subpicture that signals the APS identifiers.

According to a third embodiment, an information indicating whether APS rewriting is needed per merged track is signalled in the media file.

In this embodiment, the encapsulation may signals whether rewriting of APS identifiers is required for merging the subpicture tracks into a single bitstream in a step 412.

The de-encapsulation module may parse this information in a step 502 as an early check of the necessity to rewrite the APS identifiers in the subpicture tracks for the merged track.

The signalling of the indication whether rewriting of the APS identifier is necessary, is made in the 'spor' sample group in a first alternative. The VvcSubpicOrderEntry 'spor' sample group can be associated with a VVC track that references subpicture tracks and thus is suitable to convey information indicating whether the rewriting is needed.

For example, the 'spor' sample group syntax is extended to signal a flag that is equal to 0 when rewriting process is not needed and equal to 1 when it may or may not be needed.

```
aligned(8) class VvcSubpicOrderEntry( ) extends VisualSampleGroupEntry('spor') {
    unsigned int(1) subpic_id_info_flag;
    unsigned int(15) num_subpic_ref_idx;
    [...]
    unsigned int(1) subpic_aps_info_flag;
    if (subpic_aps_info_flag) {
        unsigned int(1) subpic_alf_aps_rewrite_flag;
    }
}
```

With the following semantics:

subpic_aps_info_flag equal to 0 specifies that no APS information is provided for the sample mapped to this sample group description entry. subpic_aps_info_flag equal to 1 specifies that APS information is provided for the sample mapped to this sample group description entry.

subpic_alf_aps_rewrite_flag equal to 0 specifies that no rewriting of the APS identifiers are required for the samples from the referenced subpicture tracks. subpic_alf_aps_rewrite_flag equal to 1 specifies that rewriting of the APS identifiers may or may not be necessary for the referenced subpicture tracks.

In a variant, the rewriting flag is signalled per referenced subpicture track. This allows the subpicture tracks that have or may have APS in their APS buffer with same type and identifier but different contents.

The semantics of the 'spor' sample group is modified as follows:

```
aligned(8) class VvcSubpicOrderEntry( ) extends VisualSampleGroupEntry('spor') {
    unsigned int(1) subpic_id_info_flag;
    unsigned int(15) num_subpic_ref_idx;
    [...]
    unsigned int(1) subpic_aps_info_flag;
    if (subpic_aps_info_flag) {
        if (num_subpic_ref_idx == 0)
            unsigned int(16) num_subpic;
        for (i = 0; i < num_subpic; i++) {
            unsigned int(1) subpic_alf_aps_rewrite_flag[i];
        }
    }
}
``` subpic_aps_info_flag keeps the same semantics.

num_subpic specifies the number of subpicture tracks included in the VVC bitstream reconstructed from the VVC track when num_subpic_ref_idx equal to 0. Otherwise (num_subpic_ref_idx not equal to 0) num_subpic is not present and is inferred equal to num_subpic_ref_idx.

subpic_alf_aps_rewrite_flag[i] equal to 0 specifies that no rewriting of the APS identifiers are required for the i-th referenced subpicture track. subpic_alf_aps_rewrite_flag[i] equal to 1 specifies that rewriting of the APS identifiers may or may not be necessary for the i-th referenced subpicture track.

In one alternative, the rewriting information is provided in a different sample group than the 'spor' sample group. The advantage is that the subpicture information present in the 'spor' group may change independently of the necessity to rewrite the APS identifiers in the sample. As a result, it may be more efficient to signal the information in separate sample groups to avoid having to repeat the same information in several sample groups when one of the reference to a subpicture track or rewriting information changes but not the other.

An APSRewritingEntry 'aprw' sample group description entry may be mapped to the samples of a track that requires rewriting of the APS identifiers in their NAL units. Samples that are not mapped to this sample group description entry, do not require APS identifier rewriting.

In another alternative, the APSRewritingEntry 'aprw' sample group conveys information relating to the rewriting of APS identifier. The syntax of this sample group uses the same elements as in previous alternative but in a dedicated sample group. For example, the syntax is the following while the semantics of the syntax element remains unchanged.

```
aligned(8) class APSRewritingEntry( ) extends VisualSampleGroupEntry('aprw') {
    unsigned int(1) subpic_aps_info_flag;
    if (subpic_aps_info_flag) {
        unsigned int(1) subpic_alf_aps_rewrite_flag;
    }
}
```

The presence of the subpic_aps_info_flag is optional when the parameters of the sample group consists of a single flag indicating if rewriting is needed.

As in previous alternative, the 'aprw' syntax may be extended to specify the subpic_alf_aps_rewrite_flag per subpicture. In that case, the sample group indicates the number of referenced subpicture track and the value of subpic_alf_aps_rewrite_flag[i] for the i-th referenced subpicture track using similar signalling loop as in previous alternative.

According to a fourth embodiment, replacement APS identifiers for each subpicture are signalled per merged track.

In this embodiment, the encapsulation process may guide the rewriting of the APS identifier by signalling replacement identifiers for the APS. The information is typically determined in step 411 during the encapsulation process. The information generated in 412 may be associated with the merged track.

The de-encapsulation process may parse this information in 508 in order to attribute new APS identifiers to the APS of the sample.

In a first alternative, the replacement identifiers for the APS are signalled in the 'spor' sample group. The principle is to signal replacement identifier values for the APSs when APS identifier rewriting is needed. For example, the syntax of the 'spor' sample group is modified as follows:

```
aligned(8) class VvcSubpicOrderEntry( ) extends VisualSampleGroupEntry('spor') {
    unsigned int(1) subpic_id_info_flag;
    unsigned int(15) num_subpic_ref_idx;
    [...]
    unsigned int(1) subpic_aps_info_flag;
    if (subpic_aps_info_flag) {
        unsigned int(1) subpic_alf_aps_rewrite_flag;
        if (subpic_alf_aps_rewrite_flag) {
            if (num_subpic_ref_idx == 0)
                unsigned int(15) num_subpic
            for (i = 0; i < num_subpic; i++) {
                for (j = 0; j < 8; j++)
                    unsigned int (3)
subpic_alf_new_aps_id[i][j]
            }
        }
    }
}
``` subpic_alf_aps_rewrite_flag and num_subpic have the same semantics as in previous embodiments.

subpic_alf_new_aps_id[j] indicates the replacement values of the identifier of the APS with identifier equal to j for the sample mapped to this sample group description entry in the i-th referenced subpicture track.

In second alternative, the replacement APS identifiers are signalled in the 'aprw' sample group of the previous embodiment. The syntax of the 'aprw' is extended as follows:

```
aligned(8) class APSRewritingEntry( ) extends VisualSampleGroupEntry('aprw') {
    unsigned int(1) subpic_aps_info_flag;
    if (subpic_aps_info_flag) {
        unsigned int(1) subpic_alf_aps_rewrite_flag;
        if (subpic_alf_aps_rewrite_flag) {
            unsigned int(15) num_subpic
            for (i = 0; i < num_subpic; i++) {
                for (j = 0; j < 8; j++)
                    unsigned int (3)
subpic_alf_new_aps_id[i][j]
            }
        }
    }
}
```

The semantics of the syntax elements are the same.

In yet a third alternative, the 'aprw' sample group is associated to samples that require rewriting of APS information in the merged track. The subpic_aps_info_flag and subpic_alf_aps_rewrite_flag are inferred equal to 1 and the syntax could be simplified as follows for the ALF APS:

```
aligned(8) class APSRewritingEntry( ) extends VisualSampleGroupEntry('aprw') {
  unsigned int(15) num_subpic_ref_minus1;
  bit(1) reserved;
  for (i = 0; i < num_subpic_ref_minus1; i++) {
    for (j = 0; j < 8; j++)
      unsigned int (3) subpic_alf_new_aps_id[i][j]
  }
}
```

The semantics of the syntax elements are:

num_subpic_ref_minus1 plus 1 specifies the number of subpicture tracks included in the VVC bitstream reconstructed from the VVC track.

The number of subpicture tracks in the bitstream may be equal to the number of 'subp' track reference in the merged track. It may also be specified by a 'spor' sample group associated with the sample mapped to the 'aprw' sample group description entry.

subpic_alf_new_aps_id[i][j] indicates the replacement values of the ALF APS with identifier equal to j for the sample group mapped to this sample group description entry in the i-th referenced subpicture track.

In yet a fourth alternative, another sample group different that 'spor' or 'aprw' may convey the rewriting information. This sample group may be associated to a subpicture track to indicate replacement identifiers for all the tracks that reference the subpicture track. The advantage of this solution is to avoid repetition of the list of replacement identifiers when they are the same for multiple merged tracks. In a variant, the replacement identifiers may be signal in the 'apbi' or 'apsi' sample group.

In the previous alternatives of this embodiment, the identifiers are systematically signalled for all the referenced subpicture track. All these alternatives may be modified to avoid signalling replacement identifiers when the APS identifiers in a subpicture track need no change. The principle is to signal the replacement identifiers when needed and infer their values when not present in the sample group.

For example, the 'aprw' sample group syntax is modified as follows (similar modifications apply also for the other sample group signalling alternatives):

```
aligned(8) class APSRewritingEntry( ) extends VisualSampleGroupEntry('aprw') {
  unsigned int(1) subpic_id_info_flag;
  unsigned int(1) subpic_aps_info_flag;
  if (subpic_aps_info_flag) {
    if (num_subpic_ref_idx == 0)
      unsigned int(15) num_subpic
    for (i = 0; i < num_subpic; i++) {
      unsigned int(1) subpic_alf_aps_rewrite_flag[i];
      if (subpic_alf_aps_rewrite_flag[i]) {
        for (j = 0; j < 8; j++)
          unsigned int (3)
subpic_alf_new_aps_id[i][j]
      }
    }
  }
}
``` subpic_alf_aps_rewrite_flag[i] has the same semantics as in previous embodiments.

subpic_alf_new_aps_id[i][j] indicates the replacement values of the identifier of the APS with identifier equal to j for the sample mapped to this sample group description entry in the i-th referenced subpicture track. When not present, subpic_alf_new_aps_id[i][j] is inferred equal to j.

In a variant, the sample groups may signal replacement values identifiers for a number of APS identifiers that is lower than the maximum number. For example, the sample group includes subpic_slice_aps_new_aps_id_num[i] syntax that specifies the number of replacement APS identifiers present in the sample group. This permits to avoid having to specify up to 8 ALF APS identifiers when only the first APS identifier needs to be changed.

In yet another variant, the replacement values of the identifiers are not directly signalled. Instead, the sample group signals a range of APS identifiers for the referenced subpicture track. The de-encapsulation module (or parser) may use these ranges to compute the replacement value for the identifiers as described previously.

The syntax of the sample group is for example the following when implemented in the 'aprw' sample group:

In this embodiment, the encapsulation module further describes the location of the syntax elements in the NAL units that reference identifiers of APS. For example, the encapsulation module may store in memory the locations of the sh_alf_aps_id_luma[i], sh_alf_aps_id_chroma, sh_alf_cc_cb_aps_id and sh_alf_cc_cr_aps_id syntax elements. The location of these syntax elements may be static within a subpicture track when the number of tiles and slices (and their layouts) is constant in the bitstream (which is very likely for most use cases of subpicture bitstream merging operations). In VVC, most of the syntax elements that are prior to the syntax elements referencing an APS in the slice headers are coded using fixed length. When syntax element is coded using variable length coding, it is generally constant for a given slice in each Picture Unit of the subpicture bitstream. The variable length coded syntax elements are the VVC subpicture identifier, the slice address and the slice type. The two first syntax elements are likely to be the same

```
aligned(8) class VvcSubpicOrderEntry( ) extends VisualSampleGroupEntry('spor') {
    unsigned int(1) subpic_id_info_flag;
    unsigned int(15) num_subpic_ref_idx;
    [...]
    unsigned int(1) subpic_aps_info_flag;
    if (subpic_aps_info_flag) {
        unsigned int(1) subpic_alf_aps_rewrite_flag;
        if (subpic_alf_aps_rewrite_flag) {
            if (num_subpic_ref_idx == 0)
                unsigned int(15) num_subpic
            for (i = 0; i < num_subpic; i++) {
                unsigned int (3) start_range_id[i]
                unsigned int (3) end_range_id[i]
            }
        }
    }
}
```

The semantics of subpic_alf_aps_rewrite_flag and num_subpic are the unchanged.

The start_range_id[i] specifies the start value of the range of replacement APS identifiers for the APS identifiers of the i-th referenced subpicture track in the sample mapped to the sample group description entry.

The end_range_id[i] specifies the end value of the range of replacement APS identifiers for the APS identifiers of the i-th referenced subpicture track in the sample mapped to the sample group description entry.

According to a fifth embodiment, position of syntax elements that reference APS identifier in slice headers is signalled in the media file.

for the slice of the subpicture bitstream. However, the slice type syntax element may change depending on the coding type of picture. Nevertheless, the slice type is coded using Exp-Golomb representation and thus slice type length is either 1 (for intra slice) or 3 bits (for other slice types).

The de-encapsulation module may use the location information of the syntax elements which values is an APS identifier to ease the rewriting process of the reference to APS id with a replacement value in step 510.

The location of the syntax elements which values is an APS identifier is signalled in 'spid' sample group in a first alternative. The modified syntax of the 'spid' sample group is for example the following:

```
aligned(8) class VvcSubpicIDEntry( ) extends VisualSampleGroupEntry('spid') {
    unsigned int(1) rect_region_flag;
    unsigned int(1) subpic_aps_info_flag;
    unsigned int(1) subpic_aps_reference_info_flag;
    [...]
    for (i = 0; i <= num_subpics_minus1; i++) {
        [...]
        if (subpic_aps_reference_info_flag) {
            unsigned int(16) subpic_num_slice_minus1[i];
            for (j = 0; j <= subpic_num_slice_minus1[i]; j++) {
                unsigned int(16) slice_aps_id_bit_pos[i][j];
            }
        }
    }
}
```

The subpic_aps_reference_info_flag equal to 0 specifies that no location information of reference syntax element is provided for the sample mapped to this sample group description entry.

The subpic_aps_info_flag equal to 1 specifies that location information of reference syntax element is provided for the sample mapped to this sample group description entry.

subpic_num_slice_minus1[i] plus 1 specifies the number of slices present in the i-th subpicture of the sample mapped to the sample group description entry.

slice_aps_id_bit_pos[i][j] specifies the bit position starting from 0 of the first bit of the slice header of the sh_num_alf_aps_ids_luma syntax element in the j-th slice of the i-th subpicture of sample mapped to the sample group description entry.

As a result, the de-encapsulation method may directly determine the position of the sh_num_alf_aps_ids_luma syntax element of any slice of the sample of the subpicture track. By directly accessing to this bit location, the de-encapsulation module may parse the syntax element referencing the APS identifier and rewrite their value when necessary.

In a variant, the location of each syntax element is signalled as follows:

```
aligned(8) class VvcSubpicIDEntry( ) extends VisualSampleGroupEntry('spid') {
    unsigned int(1) rect_region_flag;
    unsigned int(1) subpic_aps_info_flag;
    unsigned int(1) subpic_aps_reference_info_flag;
    [...]
    for (i = 0; i <= num_subpics_minus1; i++) {
        [...]
        if (subpic_aps_reference_info_flag) {
            unsigned int(16) subpic_num_slice[i];
            for (j = 0; j <= subpic_num_alf_slice[i]; j++) {
                unsigned int(8) subpic_num_syntax_elements_ids[i];
                for (k = 0; k <= subpic_num_syntax_elements_ids[i]; k++)
                    unsigned int(16) slice_aps_id_bit_pos[i][j][k];
            }
        }
    }
}
``` slice_aps_id_bit_pos[i][j][k] specifies the bit position starting from 0 of the first bit of the slice header of the k-th syntax element that contains an APS identifier value in the j-th slice of the i-th subpicture of sample mapped to the sample group description entry.

The semantics of other syntax elements of the sample groups remain unchanged.

In one alternative, the location of the syntax elements are specified in the 'apsi' sample group rather than the 'spid' sample group to avoid duplicating the other information of 'spid' when the position of the syntax elements in the slice header changes.

In another alternative, the locations of the syntax elements are specified in a new APSReferenceInformation 'apre' sample group in order to be signalled independently of any other information, thus minimizing the risk of duplication of signalling for each new position of syntax elements in the slice headers.

The syntax of the APSReferenceInformation sample group is for example the following using the same semantics for the syntax elements.

```
aligned(8) class APSReferenceInformation( ) extends VisualSampleGroupEntry('apre') {
    unsigned int(1) subpic_aps_reference_info_flag;
    bit(7) reserved = 0
    if (subpic_aps_reference_info_flag) {
        unsigned int(16) num_subpics_minus1;
        for (i = 0; i <= num_subpics_minus1; i++) {
            unsigned int(16) subpic_num_slice[i];
            for (j = 0; j <= subpic_num_alf_slice[i]; j++) {
                unsigned int(16) slice_aps_id_bit_pos[i][j];
            }
        }
    }
}
```

According to a sixth embodiment, rewriting information may be signalled in a metadata track.

In some cases, the rewriting process is required to rewrite APS NAL units and syntax elements in NAL units that reference these APSs at almost each sample. The sample group mechanism is more efficient when the information is valid for a group of several samples. For some media files, the rewriting may be different at each sample, which would require almost on sample group per sample.

This embodiment addresses this issue related to the sample group by defining the rewriting information in a metadata track. The merged track (or any other track) that references the subpicture track may also reference a metadata track with an 'aprw' track reference.

The samples of the metadata track contain APS Id rewriting instructions for the NAL units in the time-aligned sample of the media track.

Typically, the metadata track sample may include any information present in the sample group of the previous embodiment. In particular, the metadata track sample may signal:

New APS identifiers for the APS NAL units of the associated media sample.

New identifiers values for the syntax element that reference APS id in the Picture header (PH) and in the Slice header (SH), possibly associated with an indication of the location of the syntax element with reference to first bit of the NAL unit.

When the metadata track is associated with a merged track the sample may include a signalling loop to indicate the rewriting information for each referenced subpicture track.

When the metadata track is associated with a subpicture track the sample may include signalling to indicate the rewriting information for this subpicture track. As a result, the rewriting information applies for any merged track.

In one alternative, a merged track has:
- an 'aprw' track reference to a first metadata track and
- a 'subp' track reference to a subpicture track and this subpicture track also has an 'aprw' track reference to a second metadata track.

In that case, the rewriting information specified in the first metadata track that applies to the subpicture merged track replaces (i.e. overwrite or take the precedence of) the rewriting information present in the second metadata track.

The previous embodiments described several methods to signal information related to one APS type. The previous embodiments are described mainly for ALF APS. However, other types of APS may have also conflicting APS identifier in a merged stream.

For example, LMCS APS and SCALING_LIST APS may have different APS identifier in the subpicture bitstream. As a result, when reference to these APS in the merged bitstream they may be an issue. For this reason any of the previous embodiment that apply mainly for ALF APS may be extended to support other types of APS.

In one embodiment, the sample group includes a new aps_type syntax element that specifies to which type of APS the sample group applies. For example, the value 0 may correspond to ALF APS, 1 to LMCS APS and 2 to SCALING LIST APS.

In another embodiment, the sample group duplicates the rewriting information for one or more APS types (any combination is possible). For example, the syntax of the 'spid' sample group may be the following:

```
aligned(8) class VvcSubpicOrderEntry( ) extends VisualSampleGroupEntry('spid') {
    unsigned int(1) rect_region_flag;
    unsigned int(1) subpic_aps_info_flag;
    bit(1) reserved = 0;
    unsigned int(1) continuous_id_flag;
    unsigned int(12) num_subpics_minus1;
    for (i = 0; i <= num_subpics_minus1; i++) {
        if ((continuous_id_flag && i == 0) || !continuous_id_flag)
            unsigned int(16) subpic_id[i];
        if (rect_region_flag)
            unsigned int(16) groupID[i];
        if (subpic_aps_info_flag) {
            unsigned int(3) subpic_alf_aps_buffer_size[i];
            unsigned int(3) subpic_scaling_aps_buffer_size[i];
            unsigned int(2) subpic_lmcs_aps_buffer_size[i];
            bit(1) reserved = 0;
            for (j = 0; j <= subpic_alf_aps_buffer_size[i]; j++) {
                unsigned int(3) subpic_alf_aps_id[i][j];
                bit(5) reserved = 0;
            }
            for (j = 0; j <= subpic_scaling_aps_buffer_size[i];; j++)
            {
                unsigned int(3) subpic_scaling_aps_id[i][j];
                bit(5) reserved = 0;
            }
            for (j = 0; j <= subpic_lmcs_aps_buffer_size[i];; j++) {
                unsigned int(2) subpic_lmcs_aps_id[i][j];
                bit(6) reserved = 0;
            }
        }
    }
}
```

As in previous embodiment, subpic_alf_aps_buffer_size[i] specifies the number of ALF APSs for the i-th subpicture that are present in the APS buffer for the sample mapped to this sample group description entry.

subpic_alf_aps_id[i][j] specifies the identifier of the j-th ALF APS present in the APS buffer for the i-th subpicture of the sample mapped to this sample group description entry. The length in bits of this syntax may be determined in function of the authorized range of the APS identifiers. For example, for VVC ALF APS the range is 0 to 7, and thus 3 bits are used.

subpic_scaling_aps_buffer_size[i] specifies the number of scaling list APSs for the i-th subpicture that are present in the APS buffer for the sample mapped to this sample group description entry.

subpic_scaling_aps_id[i][j] specifies the identifier of the j-th scaling list APS present in the APS buffer for the i-th subpicture of the sample mapped to this sample group description entry. The length in bits of this syntax may be determined in function of the authorized range of the APS identifiers. For example, for VVC Scaling APS the range is 0 to 7, and thus 3 bits are used.

subpic_lmcs_aps_buffer_size[i] specifies the number of LMCS APSs for the i-th subpicture that are present in the APS buffer for the sample mapped to this sample group description entry.

subpic_lmcs_aps_id[i][j] specifies the identifier of the j-th scaling list APS present in the APS buffer for the i-th subpicture of the sample mapped to this sample group description entry. The length in bits of this syntax may be determined in function of the authorized range of the APS identifiers. For example, for VVC Scaling APS the range is 0 to 7, and thus 3 bits are used.

Below is other examples of syntax of sample groups accordingly to extended version of embodiments defined for ALF, LMCS and Scaling list APS. The semantics of the new syntax elements for LMCS and scaling list APS is similar to the ones for the ALF APS.

Example of syntax for extended 'spor' sample group with rewriting information for all APS types:

```
aligned(8) class VvcSubpicOrderEntry( ) extends VisualSampleGroupEntry('spor') {
    unsigned int(1) subpic_id_info_flag;
    unsigned int(15) num_subpic_ref_idx;
    [...]
    unsigned int(1) subpic_aps_info_flag;
    if (subpic_aps_info_flag) {
        if (num_subpic_ref_idx == 0)
            unsigned int(15) num_subpic
        for (i = 0; i < num_subpic; i++) {
            unsigned int(1) subpic_alf_aps_rewrite_flag;
            unsigned int(1) subpic_scaling_aps_rewrite_flag;
            unsigned int(1) subpic_lmcs_aps_rewrite_flag;
        }
    }
}
```

Example of syntax for extended 'aprw' sample group with rewriting information for all APS types:

```
aligned(8) class APSRewritingEntry( ) extends VisualSampleGroupEntry('aprw') {
    unsigned int(1) subpic_aps_info_flag;
    if (subpic_aps_info_flag) {
        unsigned int(15) num_subpic
        for (i = 0; i < num_subpic; i++) {
            unsigned int(1) subpic_alf_aps_rewrite_flag;
            unsigned int(1) subpic_scaling_aps_rewrite_flag;
            unsigned int(1) subpic_lmcs_aps_rewrite_flag;
        }
    }
}
```

Another example of syntax for extended 'spor' sample group with rewriting information for ALF, LMCS, scaling list APS types:

```
aligned(8) class VvcSubpicOrderEntry( ) extends VisualSampleGroupEntry('spor') {
    unsigned int(1) subpic_id_info_flag;
    unsigned int(15) num_subpic_ref_idx;
    [...]
    unsigned int(1) subpic_aps_info_flag;
    if (subpic_aps_info_flag) {
        if (num_subpic_ref_idx == 0)
            unsigned int(15) num_subpic
        for (i = 0; i < num_subpic; i++) {
            unsigned int(1) subpic_alf_aps_rewrite_flag;
            unsigned int(1) subpic_scaling_aps_rewrite_flag;
            unsigned int(1) subpic_lmcs_aps_rewrite_flag;
            if (subpic_alf_aps_rewrite_flag) {
                for (j = 0; j < 8; j++)
```

```
            unsigned int (3) subpic_alf_new_aps_id[j]
        }
        if (subpic_scaling_aps_rewrite_flag) {
            for (j = 0; j < 8; j++)
                unsigned int (3)
subpic_slice_scaling_new_aps_id[j]
        }
        if (subpic_lmcs_aps_rewrite_flag) {
            for (j = 0; j < 4; j++)
                unsigned int (2) subpic_slice_lmcs_new_aps_id[j]
        }
    }
  }
}
```

Another example of syntax for the 'aprw' sample group group with rewriting information for ALF, LMCS, scaling list APS types:
aligned(8) class APSRewritingEntry( ) extends VisualSampleGroupEntry('aprw') {

```
    unsigned int(1) subpic_alf_aps_rewrite_flag;
    unsigned int(1) subpic_lmcs_aps_rewrite_flag;
    unsigned int(1) subpic_scaling_list_aps_rewrite_flag;
    bit(5) reserved = 0
    if (subpic_alf_aps_rewrite_flag) {
        unsigned int(15) num_subpic_ref_minus1;
        bit(1) reserved;
        for (i = 0; i < num_subpic_ref_minus1; i++) {
            for (j = 0; j < 8; j++)
                unsigned int (3) subpic_alf_new_aps_id[i][j]
        }
    }
    if (subpic_lmcs_aps_rewrite_flag) {
        for (j = 0; j < 8; j++)
            unsigned int (3) subpic_lmcs_new_aps_id[j]
    }
    if (subpic_scaling_list_aps_rewrite_flag) {
        for (j = 0; j < 8; j++)
            unsigned int (3) subpic_scaling_list_new_aps_id[j]
    }
}
```

Semantics for parameters are the following:

subpic_alf_aps_rewrite_flag equal to 0 specifies that no rewriting of the ALF APS identifiers is required for the sample mapped to this sample group description entry in the i-th referenced subpicture track.the samples from referenced subpicture tracks. subpic_alf_aps_rewrite_flag equal to 1 specifies that rewriting of the LMCS APS identifiers may or may not be necessary for the sample mapped to this sample group description entry in the i-th referenced subpicture track.

subpic_lmcs_aps_rewrite_flag equal to 0 specifies that no rewriting of the LMCS APS identifiers is required for the sample mapped to this sample group description entry in the i-th referenced subpicture track.thefor the samples from referenced subpicture tracks. subpic_lmcs_aps_rewrite_flag equal to 1 specifies that rewriting of the LMCS APS identifiers may or may not be necessary for the sample mapped to this sample group description entry in the i-th referenced subpicture track.for the samples from referenced subpicture tracks.

subpic_scaling_list_aps_rewrite_flag equal to 0 specifies that no rewriting of the scaling list APS identifiers is required for the sample mapped to this sample group description entry in the i-th referenced subpicture track.for the samples from referenced subpicture tracks. subpic_scaling_list_aps_rewrite_flag equal to 1 specifies that rewriting of the scaling list APS identifiers may or may not be necessary for the sample mapped to this sample group description entry in the i-th referenced subpicture track.for the samples from referenced subpicture tracks.

subpic_alf_new_aps_id[i][j] indicates the replacement values of the ALF APS with identifier equal to j for the sample mapped to this sample group description in the i-th referenced subpicture track.

subpic_lmcs_new_aps_id[i][j] indicates the replacement values of the LMCS APS with identifier equal to j for the sample mapped to this sample group description in the i-th referenced subpicture track.

subpic_scaling_list_new_aps_id[i][j] indicates the replacement values of the scaling list APS with identifier equal to j for the sample mapped to this sample group description in the i-th referenced subpicture track.

Concerning the embodiment that indicates the positions of the syntax elements in slice header that refer to APS, the situation is different for LMCS and Scaling List APSs. Indeed, in VVC, the syntax elements that reference the LMCS and scaling list APS are in the Picture Header NAL unit and there is at most one referenced APS in the picture header. The extended sample group that applies to all APS types includes similar syntax element than the ALF-APS-only sample group but these elements refer to position in the Picture Header NAL unit.

The example of 'apre' sample group syntax defines two new syntax elements for this purpose:

```
aligned(8) class APSReferenceInformation( ) extends VisualSampleGroupEntry('apre') {
    unsigned int(1) subpic_aps_reference_info_flag;
    bit(7) reserved = 0
    if (subpic_aps_reference_info_flag) {
        unsigned int(16) num_subpics_minus1;
        for (i = 0; i <= num_subpics_minus1; i++) {
            unsigned int(16) subpic_num_slice[i];
            for (j = 0; j <= subpic_num_alf_slice[i]; j++) {
                unsigned int(16) slice_aps_id_bit_pos[i][j];
            }
```

```
        picture_header_lmcs_aps_id_bit_pos[i][j]
        picture_header_scaling_aps_id_bit_pos[i][j]
      }
    }
}
```

The semantics of the syntax element present in the 'apre' sample group for ALF-APS-only are unchanged.

picture_header_lmcs_aps_id_bit_pos[i][j] specifies the bit position starting from 0 of the first bit of the picture header of the syntax element that contains an LMCS APS identifier value in the j-th slice of the i-th subpicture of sample mapped to the sample group description entry.

picture_header_scaling_aps_id_bit_pos[i][j] specifies the bit position starting from 0 of the first bit of the picture header of the syntax element that contains an scaling APS identifier value in the j-th slice of the i-th subpicture of sample mapped to the sample group description entry.

In another embodiment, the reference in a 'spor' (or 'rror') sample group may correspond to an 'alte' track group or a subpicture track. The tracks present in the 'alte' track group are coded using compatible coding configurations to ensure the reconstruction of the merged track that may select any of the subpicture tracks in the track group would generate a decodable bitstream. In case the compatibility of coding configurations is not guaranteed, each subpicture track provides an 'apsi' sample group to help readers to check if collision on APS identifiers may occur. When a collision may occur, readers may signal rewriting information when selection from alternate subpicture tracks is solved. When the 'spor' (or 'rror') sample group references a group of subpicture tracks that are alternative subpicture tracks, the rewriting information (e.g. an 'aprw' sample group) that is associated to an 'alte' track group reference applies to any of the subpicture tracks in the 'alte' track group.

In another embodiment, the writer is constrained to signal the APS information in a subpicture track present in 'alte' track group. For example using the 'apsi' sample group. The parser then determines the APS conflicts from the 'apsi' sample group of the selected subpicture in the 'alte' track group.

Figure 7:
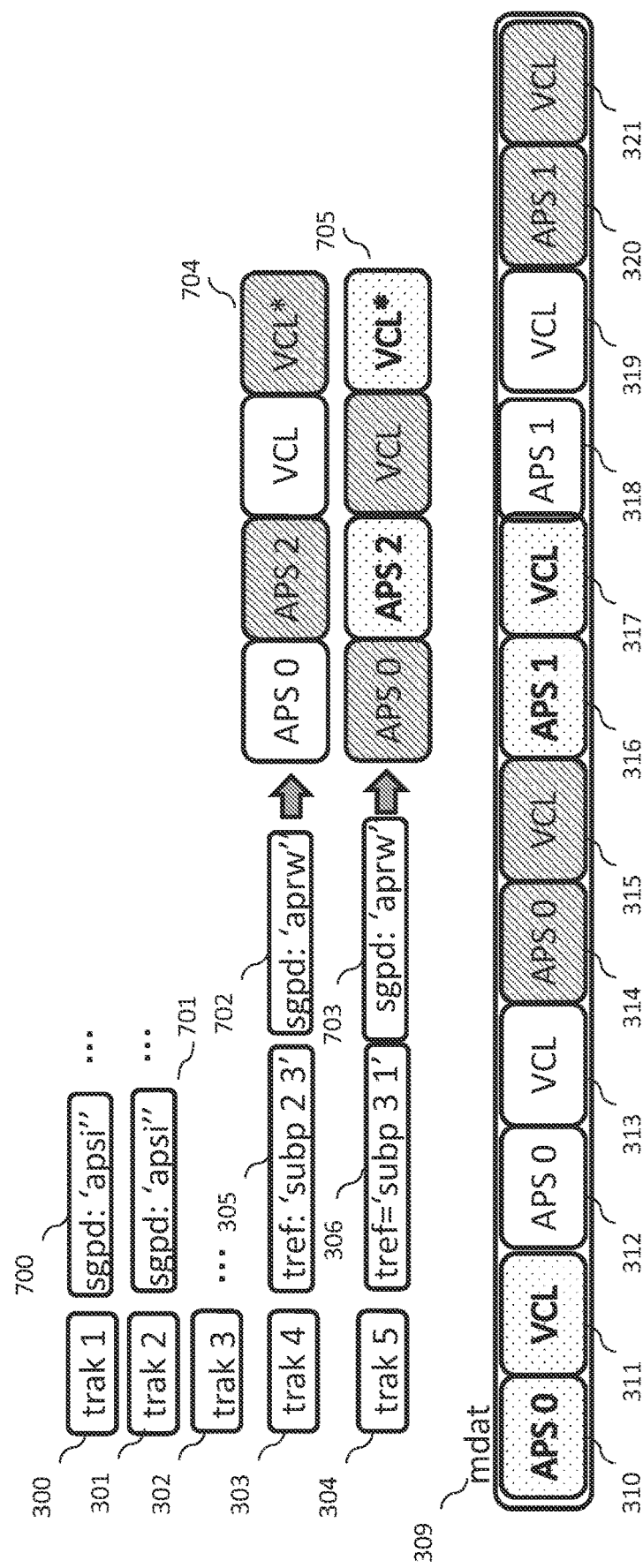
FIG. 7 illustrates a media file similar to the media file of FIG. 3 including rewriting information in the different tracks according to embodiments of the invention.

FIG. 7 illustrates a media file similar to the media file of FIG. 3 including rewriting information in the different tracks according to embodiments of the disclosure.

In this example, the rewriting information is provided in sample groups 700 to 703. In this example, the first track 300 includes an 'apsi' sample group 700 that indicates the maximum number of APSs present in the APS buffer of the samples of 300. This correspond to subpic_max_alf_aps_buffer_size equal to 1 in the 'apsi' sample group 700 indicating that each sample references at most one APS NAL unit. The 'aspi' sample group 700 may also indicates that the APS buffer comprises only APS with identifier 0 to 1.

Since the subpicture bitstreams are encoded using the same coding configuration, they have the same maximum number of APSs present in the APS buffer and they used both APS identifier 0 and 1. Thus, track 2 and track 3 have an 'apsi' sample group (701 for the subpicture track 2) that has the same content as '700'.

The merged tracks 303 and 304 contains 'aprw' sample groups 702 and 703 that signal new APS identifier to rewrite the APS of the subpicture tracks.

For example the 'aprw' sample group 702 defines subpic_alf_aps_rewrite_flag[1] equal to 0 for the first referenced subpicture track and subpic_alf_aps_rewrite_flag[1] equal to 1 for the second referenced subpicture track. The sample group then indicates the subpic_alf_new_aps_id[i][j] values of the second referenced subpicture track (i=1):
  subpic_alf_new_aps_id[1][0]=2
  subpic_alf_new_aps_id[1][1]=3
The remaining values of subpic_alf_new_aps_id[1][j] for j greater than 2 are not used and can be for example set equal to 3.

The 'aprw' sample group 703 defines subpic_alf_aps_rewrite_flag[1] equal to 0 for the first referenced subpicture track (track 302) and subpic_alf_aps_rewrite_flag[1] equal to 1 for the second referenced subpicture track. The sample group then indicates the subpic_alf_new_aps_id[i][j] values of the second referenced subpicture track (i=1):
  subpic_alf_new_aps_id[1][0]=2
  subpic_alf_new_aps_id[1][1]=3
The remaining values of subpic_alf_new_aps_id[1][j] for j greater than 2 are not used and can be for example set equal to 3 or equal to j.

When reconstructed the first sample 704 of the merged track 303, the APS with identifier equal to 0 in the subpicture track 302 is replaced with a value equal 2. The VCL NAL unit 315 is modified such that the syntax elements that reference the APS with identifier 0 are replaced with a value equal to 2.

The parser applies a rewriting process of the NAL units of the second referenced subpicture track 300 when reconstructing the first sample 705 of the second merged track 304. The APS with identifier 0 of the 312 NAL unit is modified to have a new APS identifier equal to 2 and the reference to this APS in VCL NAL unit 313 are modified to refer to the APS with identifier equal to 2.

As result the reconstructed sample accordingly to the disclosure are conformant since APSs have different identifiers (or types) when having different contents.

The text below is a modified reconstruction process of the subclause 11.6.3. of ISO/IEC14496-15 (modifications in bold) implementing some embodiments of the disclosure:

11.6.3 Reconstructing a Picture Unit from a Sample in a VVC Track with 'subp' Track References A sample of a VVC track is resolved to a picture unit in the order of the bullets:
  The AUD NAL unit, when present in the sample or in the time-aligned sample of the associated VVC non-VCL track, is included in the picture unit.
    NOTE 1: When an AUD NAL unit is present in a sample, it is the first NAL unit in the sample.
  When the sample is the first sample of a sequence of samples associated with the same sample entry, the DCI, OPI, parameter set and SE NAL units contained in the sample entry, if any, are included in the picture unit.
  When there is an associated VVC non-VCL track and the picture unit is the first picture unit in this access unit that is reconstructed from the sample, the following NAL units are included in the picture unit:
  If there is at least one NAL unit in the time-aligned sample of the associated VVC non-VCL track with nal_unit_type equal to EOS_NUT, EOB_NUT, SUFFIX_APS_NUT, SUFFIX_SEI_NUT, FD_NUT, or RSV_NVCL_27 (a NAL unit with such a NAL unit type cannot precede the first VCL NAL unit in a picture unit), the NAL units (excluding the AUD NAL unit, if any) in the time-aligned sample of the associated VVC non-VCL track up to and excluding the first of these NAL units.
  Otherwise all NAL units in the time-aligned sample of the associated VVC non-VCL track.
If there is at least one NAL unit in the sample with nal_unit_type equal to EOS_NUT, EOB_NUT, SUFFIX_APS_NUT, SUFFIX_SEI_NUT, FD_NUT, or RSV_NVCL_27 (a NAL unit with such a NAL unit type cannot precede the first VCL NAL unit in a picture unit), the NAL units in the sample up to and excluding the first of these NAL units are included in the picture unit, otherwise all NAL units in the sample in the picture unit.
If the reader has selected an operating point, the reader shall exclude any OPI NAL units stored in sample entries and samples from the reconstructed access unit in all of the steps above.
  NOTE 2: It is discouraged to include OPI NAL units in sample entries or samples when multiple tracks are used to store layers or sublayers of a VVC bitstream.
If the VVC track does not reference VVC subpicture tracks, the NAL units of the sample from the VVC track are included in the picture unit.
Otherwise, the following applies:
  The track references are resolved as specified in subclause Erreur! Source du renvoi introuvable.
  Parameter sets are updated when necessary as specified in subclause Erreur! Source du renvoi introuvable.
  The picture unit is appended by the content of the time-aligned (in decoding time) resolved sample from each referenced VVC subpicture track in the order of the VVC subpicture tracks being referenced in the 'subp' track reference (when num_subpic_ref_idx in the same group entry of the 'spor' sample group entry mapped to this sample is equal to 0) or in the order as specified in the 'spor' sample group description entry mapped to this sample (when num_subpic_ref_idx in the same group entry of the 'spor' sample group entry mapped to this sample is greater than 0), excluding all DCI, OPI, VPS, SPS, PPS, AUD, PH, EOS, EOB NAL units as well as all SEI NAL units that do not contain a scalable nesting SEI message with sn_subpic_flag equal to 1.
  When a referenced VVC subpicture track is associated with a VVC non-VCL track, the resolved sample of the VVC subpicture track contains the following NAL units:
    If there is at least one NAL unit in the time-aligned sample of the associated VVC non-VCL track with nal_unit_type equal to EOS_NUT, EOB_NUT, SUFFIX_APS_NUT, SUFFIX_SEI_NUT, FD_NUT, or RSV_NVCL_27 (a NAL unit with such a NAL unit type cannot precede the first VCL NAL unit in a picture unit), the NAL units (excluding the AUD NAL unit, if any) in the time-aligned sample of the associated VVC non-VCL track up to and excluding the first of these NAL units.
    Otherwise all NAL units in the time-aligned sample of the associated VVC non-VCL track.
  The NAL units from the sample of the referenced VVC subpicture track.
  The prefix APS NAL are reorder prior to the first VCL NAL unit of the picture unit
  The remaining NAL units, if any, from the time-aligned sample of the associated VVC non-VCL track.
  NAL units in the picture unit with nal_unit_type equal to PREFIX_APS_NUT, SUFFIX_APS_NUT, and VCL NAL units are updated when necessary as specified in subclause 11.6.7
All NAL units in the sample with nal_unit type equal to EOS_NUT, EOB_NUT, SUFFIX_APS_NUT, SUFFIX_SEI_NUT, FD_NUT, or RSV_NVCL_27.
When there is an associated VVC non-VCL track and the picture unit is the last picture unit in this access unit that is reconstructed from the sample, all NAL units in in the time-aligned sample of the associated VVC non-VCL track with nal_unit_type equal to EOS_NUT, EOB_NUT, SUFFIX_APS_NUT, SUFFIX_SEI_NUT, FD_NUT, or RSV_NVCL_27.
All NAL units or NAL unit like structures in the sample with nal_unit_type in the range of UNSPEC_28 . . . UNSPEC_31, inclusive, shall be discarded.

Subclause 11.6.7 Updating of APS NAL Units and VCL NAL Units

If a reader selects VVC tracks with 'subp' track references and if this VVC track contains an 'aprw' sample group:
  The 'aprw' sample group description entry is studied to conclude whether an APS and VCL NAL units need to be changed for samples from referenced VVC subpicture tracks. This is done after resolving the 'spor' sample group or any extraction or merging instructions provided in the VVC base track.
    The reader rewrites the aps_adaptation_parameter_set_id of APS NAL units of with aps_param_type equal to ALF_APS(0) with the value subpic_alf_new_aps_id[n][aps_adaptation_parameter_set_id] for the n-th referenced VVC subpicture track of the sample mapped to 'aprw' sample group.
    The reader rewrites the values of the VCL NAL units from the n-th referenced subpicture track:
      sh_alf_aps_id_luma[i] value is replaced with subpic_alf_new_aps_id[n][sh_alf_aps_id_luma[i]]
      sh_alf_aps_id_chroma value is replaced with subpic_alf_new_aps_id[n][sh_alf_aps_id_chroma]
      sh_alf_cc_aps_id value is replaced with subpic_alf_new_aps_id[n][sh_alf_cc_aps_id]
      and sh_alf_cc_cr_aps_id value is replaced with subpic_alf_new_aps_id[n][sh_alf_cc_cr_aps_id]

The subclause 11.6.7 is describing the updating process when rewriting information is provided to rewrite ALF APSs. In a variant, this subclause describes also the rewriting process to rewrite ALF, LMCS and scaling list APSs as follows:

If a reader selects VVC tracks with 'subp' track references and with 'aprw' sample group:
  The 'aprw' sample group description entry is studied to conclude whether some APS and VCL NAL units need to be changed for samples from referenced VVC subpicture tracks. This is done after resolving the 'spor' sample group or any extraction or merging instructions provided in the VVC base track.

The reader rewrites the aps_adaptation_parameter_set_id of APS NAL units with aps_param_type equal to ALF_APS(0) with the value subpic_alf_new_aps_id[n][aps_adaptation_parameter_set_id] for the n-th referenced VVC subpicture track of the sample mapped to 'aprw' sample group.

The reader rewrites the values of the VCL NAL units from the n-th referenced subpicture track:
sh_alf_aps_id_luma[i] value is replaced with subpic_alf_new_aps_id[n][sh_alf_aps_id_luma[i]]
sh_alf_aps_id_chroma value is replaced with subpic_alf_new_aps_id[n][sh_alf_aps_id_chroma]
sh_alf_cc_aps_id value is replaced with subpic_alf_new_aps_id[n][sh_alf_cc_aps_id]
and sh_alf_cc_cr_aps_id value is replaced with subpic_alf_new_aps_id[n][sh_alf_cc_cr_aps_id]

The reader uses subpic_lmcs_aps_rewrite_flag to conclude if the reader needs to rewrite the LMCS APS (subpic_lmcs_aps_rewrite_flag equal to 1) in NAL units of the time-aligned sample of referenced VVC subpicture tracks of the samples mapped to the 'aprw' sample group The reader rewrites the aps_adaptation_parameter_set_id of APS NAL units with aps_param_type equal to LMCS_APS(1) with the value subpic_lmcs_new_aps_id[aps_adaptation_parameter_set_id] for the referenced VVC subpicture track of the sample mapped to 'aprw' sample group.

The reader rewrites the values of the PH NAL units:
ph_lmcs_aps_id value is replaced with subpic_lmcs_new_aps_id[ph_lmcs_aps_id]

The reader uses subpic_scaling_list_aps_rewrite_flag to conclude if the reader needs to rewrite the Scaling list APS (subpic_scaling_list_aps_rewrite_flag equal to 1) in NAL units of the time-aligned sample of referenced VVC subpicture tracks of the samples mapped to the 'aprw' sample group The reader rewrites the aps_adaptation_parameter_set_id of APS NAL units with aps_param_type equal to SCALING_APS(2) with the value subpic_scaling_list_new_aps_id[aps_adaptation_parameter_set_id] for the referenced VVC subpicture track of the samples mapped to 'aprw' sample group.

The reader rewrites the values of the PH NAL units:
ph_scaling_list_aps_id value is replaced with subpic_lmcs_new_aps_id[ph_scaling_list_aps_id]

Figure 8:
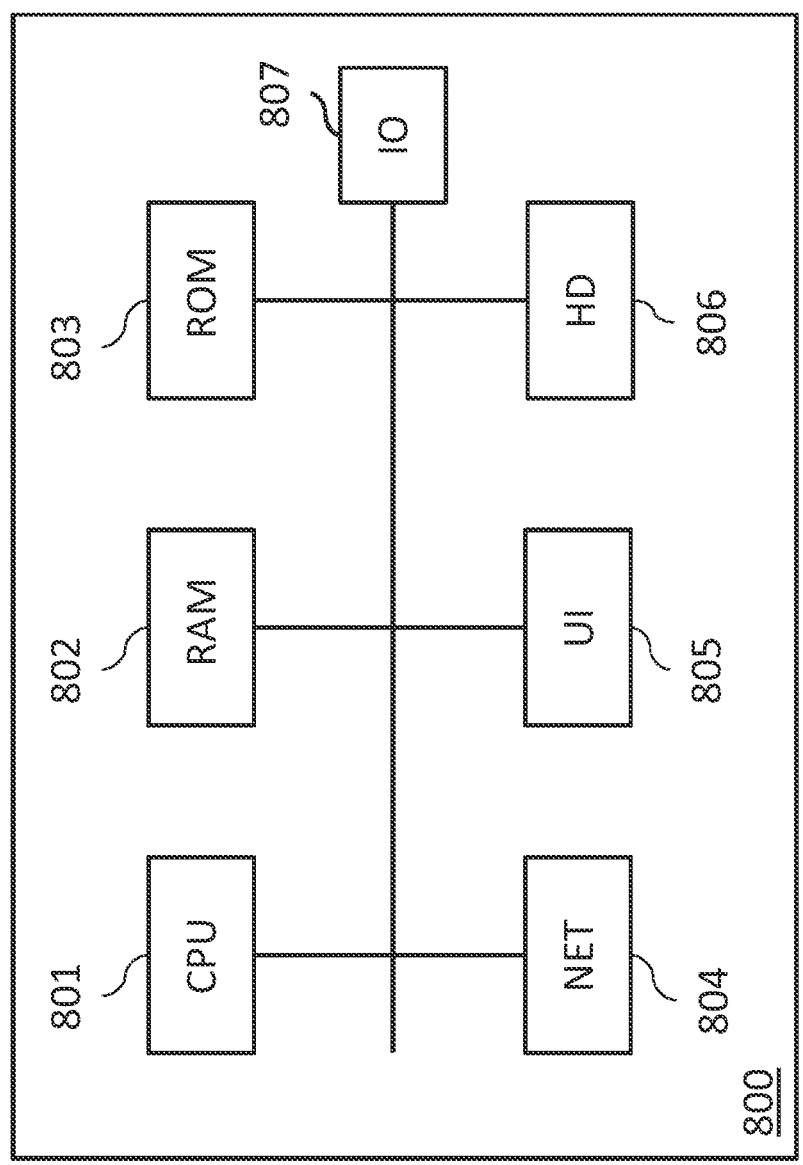
FIG. 8 is a schematic block diagram of a computing device 800 for implementation of one or more embodiments of the invention.

FIG. 8 is a schematic block diagram of a computing device 800 for implementation of one or more embodiments of the invention. The computing device 800 may be a device such as a micro-computer, a workstation or a light portable device. The computing device 800 comprises a communication bus connected to:
- a central processing unit 801, such as a microprocessor, denoted CPU;
- a random access memory 802, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;
- a read only memory 803, denoted ROM, for storing computer programs for implementing embodiments of the invention;
- a network interface 804 is typically connected to a communication network over which digital data to be processed are transmitted or received. The network interface 804 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 801;
- a graphical user interface 805 may be used for receiving inputs from a user or to display information to a user;
- a hard disk 806 denoted HD may be provided as a mass storage device;
- an I/O module 807 may be used for receiving/sending data from/to external devices such as a video source or display.

The executable code may be stored either in read only memory 803, on the hard disk 806 or on a removable digital medium such as for example a disk. According to a variant, the executable code of the programs can be received by means of a communication network, via the network interface 804, in order to be stored in one of the storage means of the communication device 800, such as the hard disk 806, before being executed.

The central processing unit 801 is adapted to control and direct the execution of the instructions or portions of software code of the program or programs according to embodiments of the invention, which instructions are stored in one of the aforementioned storage means. After powering on, the CPU 801 is capable of executing instructions from main RAM memory 802 relating to a software application after those instructions have been loaded from the program ROM 803 or the hard-disc (HD) 806 for example. Such a software application, when executed by the CPU 801, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller: or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of reconstruction of an encoded media data bitstream from at least one media file, the method comprising:
obtaining at least two subpicture bitstreams from the at least one media file, the at least two subpicture bitstreams respectively corresponding to encoded media data of a subpicture corresponding to a rectangular region of a video data;
obtaining, from the at least one media file, information for setting a decoding order of at least two subpictures corresponding to the at least two subpicture bitstreams; and
generating the encoded media data bitstream comprising reconstructed picture units based on picture units of the obtained at least two subpicture bitstreams and the obtained information,
wherein generating the encoded media data bitstream includes:
appending the picture units of the at least two subpicture bitstreams in the reconstructed picture units in the order determined based on the information for setting the decoding order of the at least two subpictures, the information for setting the decoding order of at least two subpictures includes 'spor' defined in ISO/IEC 14496-15 standard, and
for each reconstructed picture unit, reordering a prefix Adaptation Parameter Set, APS, Network Adaptation Layer, NAL unit from a corresponding picture unit of the at least two subpicture bitstreams prior to a first Video Coding Layer, VCL, NAL unit in the reconstructed picture unit.

2. The method of claim 1, wherein the at least one media file further comprises at least one subpicture track describing the at least two subpicture bitstreams, and wherein the information for setting the decoding order of the at least two subpictures is comprised in a base track referencing the at least one subpicture track.

3. The method of claim 2, wherein the information for setting the decoding order of the at least two subpictures is encapsulated into a data structure describing a group of samples of the base track.

4. The method of claim 2, wherein the base track is referencing the at least one subpicture track with a track reference of type 'subp' or 'recr'.

5. The method of claim 1, wherein generating the encoded media data bitstream includes, for each reconstructed picture unit, reordering a suffix APS NAL unit from a corresponding picture unit of the at least two subpicture bitstreams after a last VCL NAL unit in the reconstructed picture unit.

6. The method of claim 1, wherein the picture units of the at least two subpicture bitstreams appended in a reconstructed picture unit are the picture units of the at least two subpicture bitstreams that are time-aligned with the reconstructed picture unit.

7. The method of claim 1, wherein the at least one media file is a file compliant with International Standards Organization Base Media File Format, ISOBMFF.

8. A non-transitory computer-readable storage medium storing instructions of a computer program for implementing a method according to claim 1.

9. A device of reconstruction of an encoded media data bitstream from at least one media file, the device comprising a processor configured for:
obtaining at least two subpicture bitstreams from the at least one media file, the at least two subpicture bitstreams respectively corresponding to encoded media data of a subpicture corresponding to a rectangular region of video data;
obtaining, from the at least one media file, information for setting a decoding order of at least two subpictures corresponding to the at least two subpicture bitstreams;
generating the encoded media data bitstream comprising reconstructed picture units based on picture units of the obtained at least two subpicture bitstreams and the obtained information,
wherein generating the encoded media data bitstream includes:
appending the picture units of the at least two subpicture bitstreams in the reconstructed picture units in the order determined based on the information for setting the decoding order of the at least two subpictures, the information for setting the decoding order of at least two subpictures includes 'spor' defined in ISO/IEC 14496-15 standard, and
for each reconstructed picture unit, reordering a prefix Adaptation Parameter Set, APS, Network Adaptation Layer, NAL unit from a corresponding picture unit of the at least two subpicture bitstreams prior to a first Video Coding Layer, VCL, NAL unit in the reconstructed picture unit.

* * * * *